United States Patent
Xiao et al.

(10) Patent No.: US 11,189,828 B2
(45) Date of Patent: Nov. 30, 2021

(54) LITHIUM METAL POUCH CELLS AND METHODS OF MAKING THE SAME

(71) Applicant: Battelle Memorial Institute, Richland, WA (US)

(72) Inventors: Jie Xiao, Richland, WA (US); Jun Liu, Richland, WA (US); Hongkyung Lee, Richland, WA (US); Dianying Liu, Richland, WA (US); Chaojiang Niu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 88 days.

(21) Appl. No.: 16/552,315

(22) Filed: Aug. 27, 2019

(65) Prior Publication Data

US 2020/0274148 A1 Aug. 27, 2020

Related U.S. Application Data

(60) Provisional application No. 62/811,123, filed on Feb. 27, 2019, provisional application No. 62/846,471, filed on May 10, 2019.

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/505* (2013.01); *H01M 4/525* (2013.01);
(Continued)

(58) Field of Classification Search
CPC .... H01M 10/281; H01M 10/647; H01M 2/02; H01M 2/1653; H01M 2/0207; H01M 2/021; H01M 50/105; H01M 4/366
See application file for complete search history.

(56) References Cited

U.S. PATENT DOCUMENTS 8,481,187 B2 7/2013 Zhang et al.
9,899,698 B2 * 2/2018 Ku ................... H01M 10/0431
(Continued)

FOREIGN PATENT DOCUMENTS

WO WO 2017/214900 A1 12/2017
WO WO 2018/098494 A1 5/2018

OTHER PUBLICATIONS

International Search Report and Written Opinion, dated Jun. 16, 2020, for corresponding International Application No. PCT/US2020/018996.
(Continued)

*Primary Examiner* — Amanda C. Walke
(74) *Attorney, Agent, or Firm* — Klarquist Sparkman, LLP

(57) ABSTRACT

A lithium metal pouch cell having a specific energy $\geq 300$ $Wh \cdot kg^{-1}$ includes an anode comprising lithium metal and an anode current collector, the anode having an areal capacity N ($mAh \cdot cm^{-2}$); a cathode comprising a cathode material and a cathode current collector, the cathode having an a real capacity P ($mAh \cdot cm^{-2}$), wherein a ratio of N/P is within a range of 0.02 to 5; an electrolyte having an electrolyte mass E and comprising a lithium active salt and a solvent, the lithium metal pouch cell having an electrolyte mass to cell capacity (E/C) ratio within a range of 1 to 6 $g \cdot Ah^{-1}$; a separator positioned between the anode and the cathode; and a packaging material defining a pouch enclosing the anode, cathode, electrolyte, and separator; wherein a protruding tab of the anode current collector and a protruding tab of the cathode current collector are external to the pouch.

20 Claims, 17 Drawing Sheets

(51) Int. Cl.
H01M 4/66 (2006.01)
H01M 4/525 (2010.01)
H01M 10/0525 (2010.01)
H01M 4/505 (2010.01)

(52) U.S. Cl.
CPC ....... *H01M 4/661* (2013.01); *H01M 10/0525* (2013.01)

(56) References Cited

U.S. PATENT DOCUMENTS

| | | | |
|---|---|---|---|
| 2005/0191545 A1* | 9/2005 | Bowles | H01M 50/10 429/127 |
| 2011/0059364 A1 | 3/2011 | Zhang et al. | |
| 2013/0273443 A1 | 10/2013 | Zhang et al. | |
| 2015/0037690 A1* | 2/2015 | Dalavi | H01M 10/0525 429/331 |
| 2016/0028048 A1* | 1/2016 | Lee | H01M 50/502 429/178 |
| 2016/0079573 A1 | 3/2016 | Nelson et al. | |
| 2016/0111727 A1* | 4/2016 | Li | H01M 4/134 429/221 |
| 2016/0351900 A1 | 12/2016 | Sekiya et al. | |
| 2017/0222206 A1 | 8/2017 | Carlson | |
| 2017/0317331 A1 | 11/2017 | Vedoy | |
| 2018/0254524 A1 | 9/2018 | Zhang et al. | |
| 2019/0181427 A1* | 6/2019 | Yang | H01M 10/446 |
| 2019/0348668 A1* | 11/2019 | Kim | H01M 4/66 |
| 2020/0067126 A1* | 2/2020 | Han | H01M 10/0468 |

OTHER PUBLICATIONS

Barai et al., "Impact of external pressure and electrolyte transport properties on lithium dendrite growth," *Journal of the Electrochemical Society* (Aug. 22, 2018) 165(11): A2654-A2666.

Bond et al., "Electrode Stack Geometry Changes during Gas Evolution in Pouch-Cell-Type Lithium Ion Batteries," *Journal of the Electrochemical Society* (Nov. 22, 2016) 164(1): A6158-A6162.

Cannarella et al., "Stress evolution and capacity fade in constrained lithium-ion pouch cells," *Journal of Power Sources* (Jul. 13, 2013) 245: 745-751.

Chen et al., "High-Efficiency Lithium Metal Batteries with Fire-Retardant Electrolytes," *Joule* (Aug. 15, 2018) 2(8): 1548-1558.

Chen et al., "High-Voltage Lithium-Metal Batteries Enabled by Localized High-Concentration Electrolytes," *Advanced Materials* (Mar. 25, 2018) 30 (21): 1706102,7 PP.

Cheng et al., "The gap between long lifespan Li—S coin and pouch cells: The importance of lithium metal anode protection," *Energy Storage Materials* (2017) 6: 18-25.

Ding et al., "Dendrite-Free Lithium Deposition via Self-Healing Electrostatic Shield Mechanism," *Journal of the American Chemical Society* (Feb. 28, 2013) 135(11): 4450-4456.

Dixon et al., "Effects of electrolyte, loading rate and location of indentation on mechanical integrity of Li-ion pouch cells," *Journal of Power Sources* (Jun. 17, 2018) 396: 412-420.

Hagen et al., "Lithium-Sulfur Cells: The Gap between the State-of-the-Art and the Requirements for High Energy Battery Cells," *Advanced Energy Materials* (Apr. 11, 2015) 5(16): 1401986, 11 pp.

Kumar et al., "Communication—Indentation of Li-Ion Pouch Cell: Effect of Material Homogenization on Prediction of Internal Short Circuit," *Journal of the Electrochemical Society* (Sep. 12, 2016) 163 (10): A2494-A2496.

Lu et al., "Failure Mechanism for Fast-Charged Lithium Metal Batteries with Liquid Electrolytes," *Advanced Energy Materials* (Sep. 11, 2015) 5(3): 1400993, 7 pp.

Muenzel et al., "A Comparative Testing Study of Commercial 18650-Format Lithium-Ion Battery Cells," *Journal of the Electrochemical Society* (May 28, 2015) 162(8): A1592-A1600.

Mussa et al., "Effects of external pressure on the performance and ageing of single-layer lithium-ion pouch cells," *Journal of Power Sources* (Mar. 13, 2018) 385: 18-26.

Nelson et al., "A Comparison of NMC/Graphite Pouch Cells and Commercially Available LiCoO$_2$/Graphite Pouch Cells Tested to High Potential," *Journal of the Electrochemical Society* (Feb. 8, 2018) 165(3): A456-A462.

Qian et al., "High rate and stable cycling of lithium metal anode," *Nature communications* (Feb. 20, 2015) 6: 6362, 9 pp.

Sahraei et al., "Calibration and finite element simulation of pouch lithium-ion batteries for mechanical integrity," *Journal of Power Sources* (Nov. 3, 2011) 201: 307-321.

Samba et al., "Impact of Tab Location on Large Format Lithium-Ion Pouch Cell Based on Fully Coupled Tree-Dimensional Electrochemical-Thermal Modeling," *Electrochimica Acta* (Sep. 30, 2014) 147: 319-329.

Self et al., "Survey of Gas Expansion in Li-Ion NMC Pouch Cells," *Journal of the Electrochemical Society* (Feb. 19, 2015) 162(6): A796-A802.

Tarascon et al., "Issues and challenges facing rechargeable lithium batteries," *Nature* (Nov. 15, 2001) 414: 359-367.

Wang et al., "Fundamental Understanding and Rational Design of High Energy Structural Microbatteries," *Nano Energy* (Jan. 1, 2018) 43: 310-316, https://doi.org/10.1016/j.nanoen.2017.11.046 (author's accepted manuscript).

Wu et al., "The interplay between solid electrolyte interface (SEI) and dendritic lithium growth," *Nano Energy* (Aug. 4, 2017) 40: 34-41.

Xu et al., "Lithium metal anodes for rechargeable batteries," *Energy & Environmental Science* (2014) 7(2): 513-537.

Yin et al., "Insights into morphological evolution and cycling behaviour of lithium metal anode under mechanical pressure," *Nano Energy* (Jun. 5, 2018) 50: 659-664.

* cited by examiner

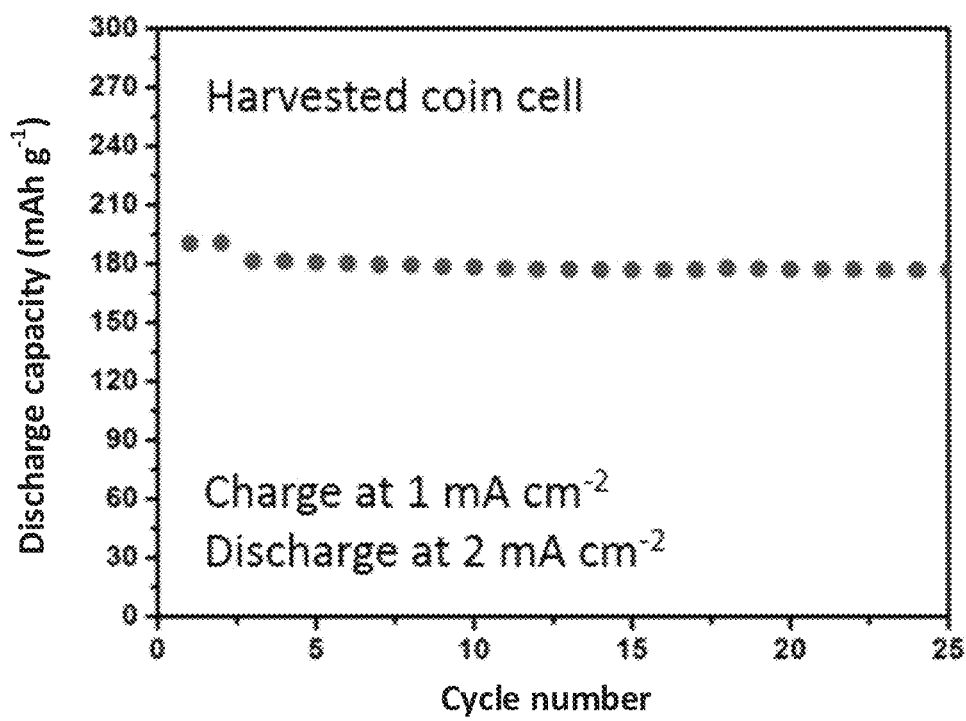
FIG. 22
FIG. 23A            FIG. 23B
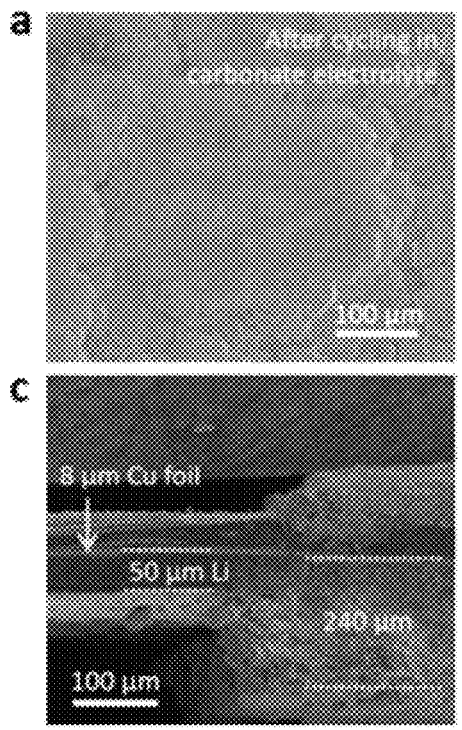
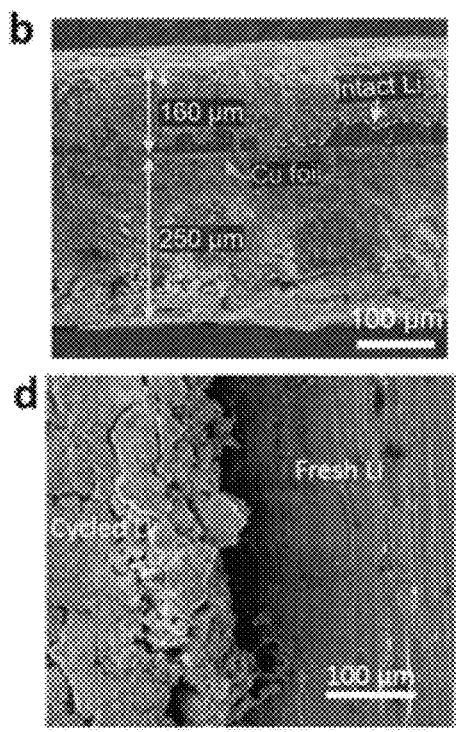
FIG. 23C            FIG. 23D

LITHIUM METAL POUCH CELLS AND METHODS OF MAKING THE SAME

CROSS REFERENCE TO RELATED APPLICATIONS

This application claims the benefit of the earlier filing date of U.S. Provisional Application No. 62/811,123, filed Feb. 27, 2019, and U.S. Provisional Application No. 62/846,471, filed May 10, 2019, each of which is incorporated by reference herein in its entirety.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

Lithium metal pouch cells and methods of making the pouch cells are disclosed.

SUMMARY

Embodiments of a high-energy lithium metal pouch cell with a specific energy 300 Wh/kg are disclosed. In some embodiments, the lithium metal pouch cell includes an anode comprising lithium metal and an anode current collector, the anode having an anode areal capacity from 0 to 10 mAh·cm$^{-2}$; a cathode comprising a cathode material and a cathode current collector, the cathode having a cathode areal capacity from 2 to 10 mAh·cm$^{-2}$, wherein a ratio of N/P is within a range of 0 to 5; an electrolyte comprising a lithium active salt and a solvent, the electrolyte having an electrolyte mass E and the lithium metal pouch cell having an electrolyte mass to cell capacity (E/C) ratio within a range of 1 to 6 g·Ah$^{-1}$; a separator positioned between the anode and the cathode; and a packaging material defining a pouch enclosing the anode, cathode, electrolyte, and separator; wherein a protruding tab of the anode current collector and a protruding tab of the cathode current collector extend external to the pouch, the lithium metal pouch cell having a specific energy 300 Wh·kg$^{-1}$. In certain embodiments, the lithium metal pouch cell includes a plurality of anodes, a plurality of cathodes, and a plurality of separators, wherein a separator is positioned between each anode and an adjacent cathode.

In any of the foregoing embodiments, the anode may comprise a first layer of lithium metal and a second layer of lithium metal affixed to opposing sides of the anode current collector, wherein (i) each layer of lithium metal has a thickness within a range of 0 to 60 µm prior to cycling the lithium metal pouch cell; or (ii) the anode current collector has a thickness within a range of 50 nm to 10 µm; or (iii) both (i) and (ii). In any of the foregoing embodiments, the cathode may comprise a first layer of cathode material and a second layer of cathode material affixed to opposing sides of the cathode current collector, wherein (i) each layer of cathode material has a thickness within a range of 50 to 200 µm; or (ii) the cathode current collector has a thickness within a range of 8 to 20 µm; or (iii) both (i) and (ii).

In some embodiments, the anode current collector has a thickness within a range of a 50 nm to 3 µm, the first layer of lithium metal has a first surface in contact with the anode current collector and the protruding tab of the anode current collector extends past a terminal end of the first layer of lithium metal, and the second layer of lithium metal has a first surface in contact with the anode current collector and an opposing surface, and the protruding tab of the anode current collector extends past a terminal end of the second layer of lithium metal. In such embodiments, the lithium metal pouch cell may further comprise a support tab affixed to the opposing surface of the second layer of lithium metal adjacent the terminal end of the second layer and aligned with the protruding tab of the anode current collector, the support tab extending past the terminal end of the second layer of lithium and having a terminal end external to the pouch. In some embodiments, (i) the terminal end of the support tab is aligned with a terminal end of the protruding tab of the anode current collector; or (ii) a proximal end of the support tab is aligned with the terminal end of the first layer of lithium metal; or (iii) both (i) and (ii). In any of the foregoing embodiments, the support tab may be a perforated metal tab and/or the support tab may be made of the same material as the anode current collector. In any of the foregoing embodiments, the support tab may have a thickness within a range of 3-18 µm and/or a length within a range of 2-10 mm. If the lithium metal pouch cell comprises a plurality of anodes and cathodes, each anode may include a support tab wherein the protruding tabs of the anode current collectors and the support tabs may be adhered together.

In any of the foregoing embodiments, (i) the lithium metal may comprise from 4 to 10 wt % of the pouch cell; or (ii) the anode current collector and support tab together comprise from 5 to 10 wt % of the pouch cell; or (iii) the cathode material may comprise from 40 to 60 wt % of the pouch cell; or (iv) the cathode current collector may comprise from 2 to 6 wt % of the pouch cell; or (v) the electrolyte may comprise from 20 to 30 wt % of the pouch cell; or (vi) the separator may comprise from 2 to 5 wt % of the pouch cell; or (vii) the packaging material may comprise from 5 to 10 wt % of the pouch cell; or (viii) any combination of (i), (ii), (iii), (iv), (v), (vi), and (vii).

In some embodiments, a lithium metal pouch cell system includes a lithium metal pouch cell as disclosed herein and an external pressure-applying device configured to apply a compression force to the lithium metal pouch cell. In some embodiments, the compression force is within a range of 35 to 105 kPa. In any of the foregoing embodiments, the lithium metal pouch cell may exhibit 70% capacity retention after 50 cycles when operated under a compression force of 60-80 kPa.

The foregoing and other objects, features, and advantages of the invention will become more apparent from the following detailed description, which proceeds with reference to the accompanying figures.

BRIEF DESCRIPTION OF THE DRAWINGS

FIG. 22 shows the cycling performance of a coin cell including the used cathode from the pouch cell of FIG. 17.

FIGS. 23A-23D are SEM images of the lithium anode of FIG. 17 after cycling; FIGS. 23A and 23B, respectively, are a top view and cross-sectional SEM image of the Li anode after cycling; FIGS. 23C and 23D are, respectively, cross-sectional and top view SEM images of the cycled Li anode at the edge.

DETAILED DESCRIPTION

Figure 1:
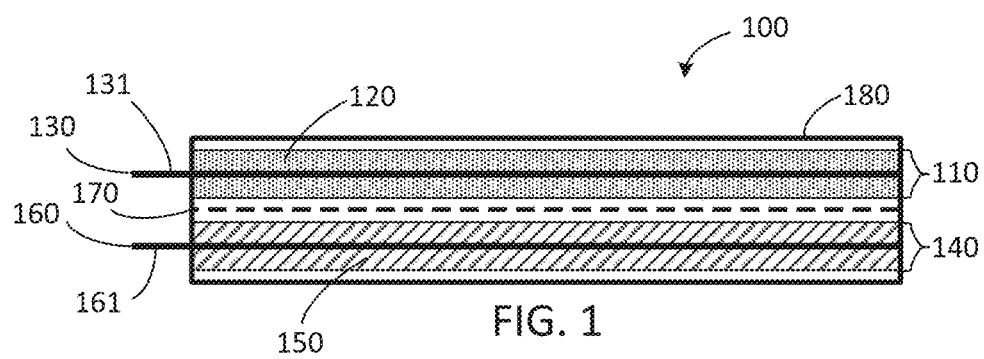
FIG. 1 is a schematic side elevation view of a simplified pouch cell.

Conventional Lithium (Li) ion batteries (LIBs) will quickly approach their energy limit without the utilization of new high voltage/capacity electrode materials. The upper limit of cell energy for a LIB appears to be about 300 Wh/kg. To significantly boost the cell specific energy and develop technologies beyond Li-ion chemistry, Li metal, which is ultralight and energy dense, is widely considered as one of the most promising anode materials to replace the graphite anode.

Lithium metal batteries have received wide interest for energy storage. However, it is difficult to evaluate and compare advances in the literature for practical applications. A key challenge is the gap between the fundamental materials research and the cell-level materials integration. Literature reports are often based on coin cell testing using a wide range of experimental conditions drastically different from the parameters in realistic cells. Similar standards and/or consisting testing protocols based on targeting cell-level energy are need to accelerate the discovery and deployment of new concepts in realistic battery systems.

This disclosure concerns embodiments of a high-energy pouch cell with a specific energy greater than or equal to 300 Wh/kg for use in exploring key issues in future high-energy batteries. Based on results with the pouch cell, further disclosed are embodiments of a testing protocol suitable for use in coin cells to close the gap between coin cell and pouch cell performance evaluation.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), Hawley's Condensed Chemical Dictionary, published by John Wiley & Sons, Inc., 1997 (ISBN 0-471-29205-2).

In order to facilitate review of the various embodiments of the disclosure, the following explanations of specific terms are provided:

Active salt: As used herein, the term "active salt" refers to a salt that significantly participates in electrochemical processes of electrochemical devices. In the case of batteries, it refers to charge and discharge processes contributing to the energy conversions that ultimately enable the battery to deliver/store energy. As used herein, the term "active salt" refers to a salt that constitutes at least 5% of the redox active materials participating in redox reactions during battery cycling after initial charging.

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. If the anode is composed of a metal, electrons that it gives up to the external circuit are accompanied by metal cations moving away from the electrode and into the electrolyte. When the battery is recharged, the anode becomes the positive terminal where electrons flow in and metal cations are reduced.

Areal capacity or specific areal capacity is the capacity per unit area of the electrode (or active material) surface, and is typically expressed in united of mAh cm$^{-2}$.

BTFEMO: bis(2,2,2-trifluoroethyl) methyl orthoformate

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized.

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A battery includes one or more cells. The terms "cell" and "battery" are used interchangeably when referring to a battery containing only one cell.

Cosolvent: A solvent that, in conjunction with another solvent, dissolves a solute.

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle. CE of Li||Cu or Na||Cu cells may be defined as the amount of charge flowing out of the battery during stripping process divided by the amount of charge entering the battery during plating process.

DEC: diethyl carbonate
DFEC: difluoroethylene carbonate
Diluent: As used herein, the term "diluent" refers to a component used to dilute an electrolyte, where the lithium active salt is insoluble or poorly soluble in the diluent. As used herein, "poorly soluble" means that the active salt has a solubility in the diluent at least 10× less than a solubility of the active salt in the solvent.

DMC: dimethyl carbonate
DME: 1,2-dimethoxyethane
DMS: dimethyl sulfone
DMSO: dimethyl sulfoxide
DOL: 1,3-dioxolane
EC: ethylene carbonate
Electrolyte: A substance containing free ions that behaves as an electrically conductive medium. Electrolytes generally comprise ions in a solution, but molten electrolytes and solid electrolytes also are known.

EMC: ethyl methyl carbonate
EMS: ethyl methyl sulfone
EOFB: ethoxynonafluorobutane
EVS: ethyl vinyl sulfone
FEC: fluoroethylene carbonate
Flame retardant: As used herein, the term "flame retardant" refers to an agent incorporated into an electrolyte to reduce or eliminate its tendency to ignite during operation of an electrochemical device including the electrolyte.

Flammable: The term "flammable" refers to a material that will ignite easily and burn rapidly. As used herein, the term "non-flammable" means that an electrolyte, will not ignite or burn during operation of an electrochemical device including the electrolyte. As used herein, the terms "flame retarded" and "low flammability" are interchangeable and mean that a portion of the electrolyte may ignite under some conditions, but that any resulting ignition will not propagate throughout the electrolyte. Flammability can be measured by determining the self-extinguishing time (SET) of the electrolyte. The SET is determined by a modified Underwriters Laboratories test standard 94 HB. An electrolyte is immobilized on an inert ball wick, such as a ball wick having a diameter of ~0.3-0.5 cm, which is capable of absorbing 0.05-0.10 g electrolyte. The wick is then ignited, and the time for the flame to extinguish is recorded. The time is normalized against the sample weight. If the electrolyte does not catch flame, the SET is zero and the electrolyte is non-flammable. Electrolytes having an SET of <6 s/g (e.g., the flame extinguishes within ~0.5 s) are also considered non-flammable. If the SET is >20 s/g, the electrolyte is considered to be flammable. When the SET is between 6-20 s/g, the electrolyte is considered to be flame retarded or have low flammability.

FMES: trifluoromethyl ethyl sulfone
FMIS: trifluoromethyl isopropyl sulfone
FPMS: trifluoropropyl methyl sulfone
Intercalation: A term referring to the insertion of a material (e.g., an ion or molecule) into the microstructure of another material. For example, lithium ions can insert, or intercalate, into graphite (C) to form lithiated graphite ($LiC_6$).

LiBETI: lithium bis(pentafluoroethanesulfonyl)imide
LiFSI: lithium bis(fluorosulfonyl)imide
LiTFSI: lithium bis(trifluoromethanesulfonyl)imide
LiBOB: lithium bis(oxalato)borate
LiDFOB: lithium difluoro oxalato borate anion
LSE: localized superconcentrated electrolyte
MEC: methylene ethylene carbonate
MOFB: methoxynonafluorobutane
PC: propylene carbonate
Perforated: Including holes or apertures formed by piercing or puncturing a sheet material. A perforated material has a first dimpled surface and an opposing surface including protrusions around the holes wherein the dimples and protrusions are formed by the piercing or puncturing process. The protrusions are the material displaced by forming the holes.

Pouch cell: A pouch cell is a battery completely, or substantially completely, encased in a flexible outer covering, e.g., a heat-sealable foil, a fabric, or a polymer membrane. The term "flexible" means that the outer covering is easy to bend without breaking; accordingly, the outer covering can be wrapped around the battery components. Because a pouch cell lacks an outer hard shell, it is flexible and weighs less than conventional batteries.

SEI: solid electrolyte interphase
Separator: A battery separator is a porous sheet or film placed between the anode and cathode. It prevents physical contact between the anode and cathode while facilitating ionic transport.

Soluble: Capable of becoming molecularly or ionically dispersed in a solvent to form a homogeneous solution. As used herein, the term "soluble" means that an active salt has a solubility in a given solvent of at least 1 mol/L (M, molarity) or at least 1 mol/kg (m, molality).

Solution: A homogeneous mixture composed of two or more substances. A solute (minor component) is dissolved in a solvent (major component). A plurality of solutes and/or a plurality of solvents may be present in the solution.

Specific energy: A term that refers to energy per unit of mass. Specific energy is commonly expressed in units of Wh/kg or J/kg.

TDFEO: tris(2,2-difluoroethyl)orthoformate
TEPa: triethyl phosphate
TEPi: triethyl phosphite
TFEC: trifluoroethylene carbonate
TFEO: tris(2,2,2-trifluoroethyl)orthoformate
THFiPO: tris(hexafluoroisopropyl)orthoformate
TMPa: trimethyl phosphate
TMPi: trimethyl phosphite
TMS: tetramethylene sulfone or sulfolane
TPFPO: tris(2,2,3,3,3-pentafluoropropyl)orthoformate
TTE: 1,1,2,2-tetrafluoroethyl-2,2,3,3-tetrafluoropropyl ether
TTPO: tris(2,2,3,3-tetrafluoropropyl)orthoformate
VC: vinylene carbonate
VEC: 4-vinyl-1,3-dioxolan-2-one or vinyl ethylene carbonate

II. LITHIUM POUCH CELLS

In order to understand and evaluate the performances of materials for future Li metal battery applications, testing needs to be done at conditions that meet the basic requirements of a high energy cell. Currently, three major cell formats are commercially used, cylindrical, prismatic, and pouch. Among them, pouch cells based on layered construction allow maximum use of space and active materials, and are therefore popular for large cell formats. Disclosed herein are embodiments of a pouch cell having a specific energy ≥300 Wh·kg⁻¹, such as a specific energy within a range of 300-500 Wh·kg⁻¹. In some embodiments, the pouch cell also has a cell capacity ≥1.0 Ah.

FIG. 1 is a schematic side elevation view of one embodiment of a simplified pouch cell 100. The pouch cell 100 comprises an anode 110 comprising lithium metal 120 and an anode current collector 130, a cathode 140 comprising a cathode material 150 and a cathode current collector 160, a separator 170, and a packaging material defining a pouch 180 enclosing the anode 110, cathode 140, and separator 170. The pouch 180 further encloses an electrolyte (not shown). The anode current collector 130 has a protruding tab 131 that extends external to the pouch 180, and the cathode current collector 160 has a protruding tab 161 that extends external to the pouch 180. The pouch cell weight includes all components of the cell, i.e., anode, cathode, separator, electrolyte, and pouch material.

Figure 2:
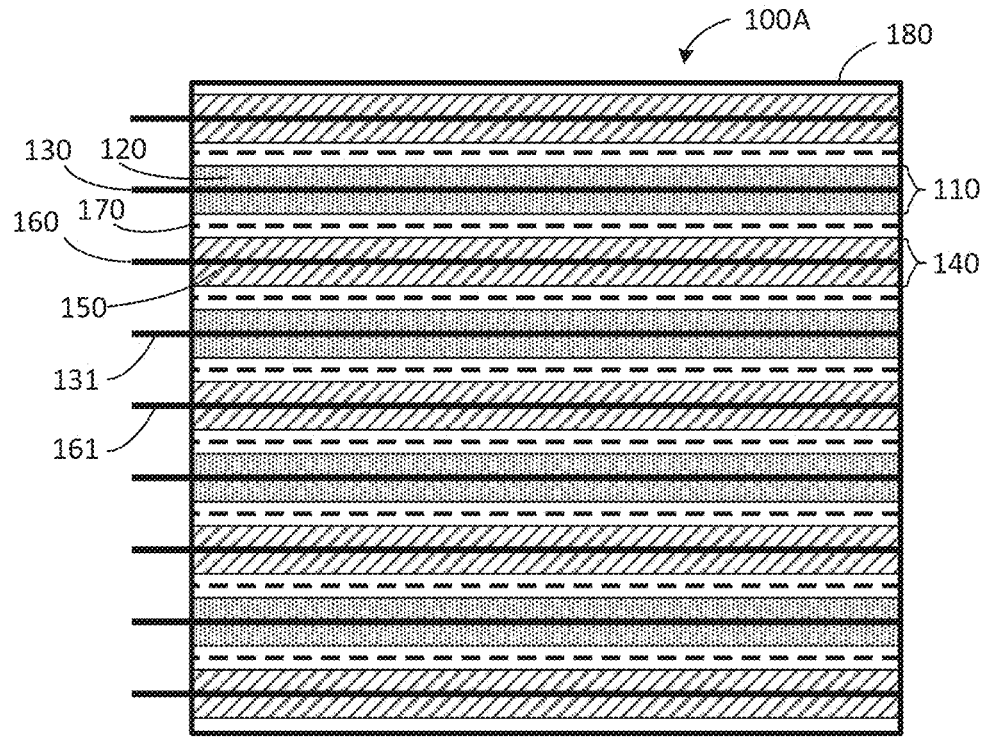
FIG. 2 is a schematic side elevation view of a multilayered pouch cell.
Figure 3:
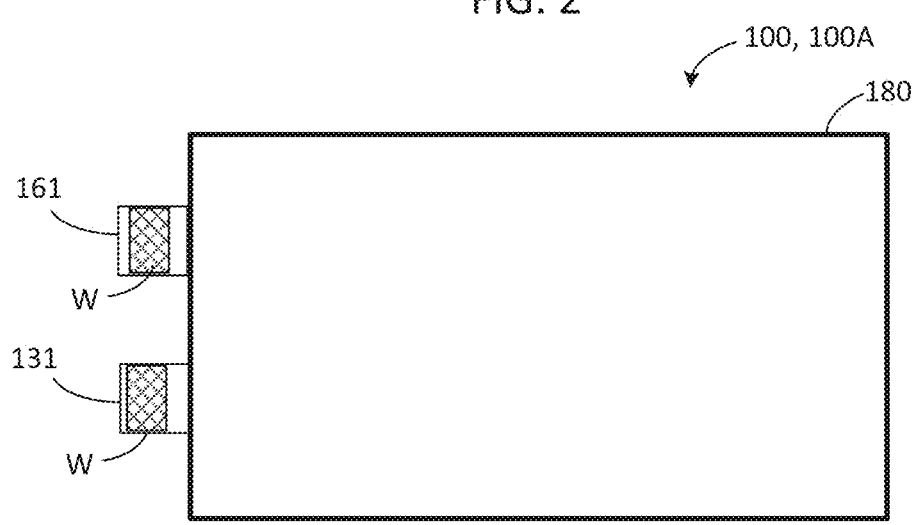
FIG. 3 is a schematic top plan view of a pouch cell.

To build a pouch cell with a high specific energy, it is desirable to increase cell capacity as much as is feasible without significantly increasing the total weight of the pouch cell. In some embodiments, a high specific energy pouch cell is made with repeating units including alternate layers of cathode, separator, and anode in a single pouch. In certain embodiments, the stack of repeating units may be terminated with the same type of electrode as present on the bottom of the stack, i.e., the multilayered stack may start and end with a cathode, or it may start and end with an anode. FIG. 2 shows an exemplary multilayered pouch cell 100A comprising a plurality of anodes 110, cathodes 140, and separators 170 enclosed within a pouch 180. An electrolyte (not shown) is also enclosed within the pouch 180. The pouch cell 100A shown in FIG. 2 includes four anodes, five cathodes, and eight separators. It is understood, however, that the pouch cell may include more or fewer repeating units. For instance, in some examples, the pouch cell may include from 2-20 repeating units, such as 2-15, 2-10, or 5-10 repeating units, optionally terminating with an additional anode or cathode (e.g., 8 cathodes alternating with 7 anodes or 6 anodes alternating with 5 cathodes). Each anode 110 comprises two layers of lithium metal 120 adhered to an anode current collector 130, the anode current collector including a protruding tab 131 extending external to the pouch 180. Each Li metal layer may have a thickness 60 μm a such as a thickness within a range of 1-60 μm, 2-60 μm, 2-60 μm, 20-60 μm, 30-60 μm or 40-60 μm prior to cycling the pouch cell. Each cathode 140 comprises two layers of cathode material 150 adhered to a cathode current collector 160, the cathode current collector 160 including a protruding tab 161 extending external to the pouch 180. In some embodiments, each layer of cathode material has a thickness within a range of 50-200 μm, such as within a range of 50-150 μm, 50-100 μm, or 60-80 μm. Advantageously, when viewed from the top as shown in FIG. 3, the anode protruding tabs 131 of the plurality of anodes are aligned with one another. The cathode protruding tabs 161 of the plurality of cathodes are aligned with one another and laterally spaced apart from the anode protruding tabs 131. In some embodiments, the anode protruding tabs 131 are adhered together to provide a thicker, more sturdy protruding tab. Similarly, the cathode protruding tabs are adhered together to provide a thicker more sturdy protruding tab. The protruding tabs may be adhered together by any suitable means including, but not limited to, welding (W). Electrical connections (not shown) are made to the protruding tabs 131, 161.

A pouch cell has a total weight based on the weights of the anode(s), cathode(s), separator(s), electrolyte, and packaging material. It is desirable to minimize parasitic weight, e.g., weight contributed by the anode and cathode current collectors, cathode inactive materials (binders and additives such as carbon), excess lithium metal, electrolyte solvent, and packaging material. Practical considerations, such as material handling, material availability, and stability, influence the cell construction. For instance, lithium foils <50 μm in thickness are challenging to handle. However, in some disclosed embodiments, lithium foils having a thickness of 50 μm are utilized, such as lithium foils having a thickness within a range of 1-50 μm, 20-50 μm, or 30-50 μm prior to cycling the pouch cell. Parasitic weight of the cathode material is minimized by increasing the active material mass loading and decreasing the carbon and binders.

Another way to reduce parasitic weight is to reduce the weight of the anode current collector. Copper is a common choice for the anode current collector. Copper has a density of 8.96 g/cm³, however, making it a significant contributor to parasitic weight of the pouch cell. In some embodiments, a pouch cell as shown in FIGS. 1-3 may have a copper anode current collector 130 comprising copper foil with a thickness of 6-9 μm or more. Thinner copper foils (e.g., 2 μm) are commercially available and may increase the specific energy of the pouch cell by 10-15 Wh/kg relative to an 8-μm thick copper foil. Using such thin copper foils would be advantageous, but they are more challenging to handle. The protruding tab 131 of the anode current collector is prone to breakage when it is too thin. Even when a plurality of protruding tabs 131 are adhered together, portions of the protruding tabs immediately adjacent to the pouch 180 are not adhered and may be too thin for routine handling. An additional concern is that current flowing through the protruding tab 131 has a resistance and generates heat. When the protruding tab 131 is particularly thin, the resistance and heat generation may be sufficiently great to melt the packaging material in contact with the tab and potentially even great enough to melt the copper tab.

Figure 4A:
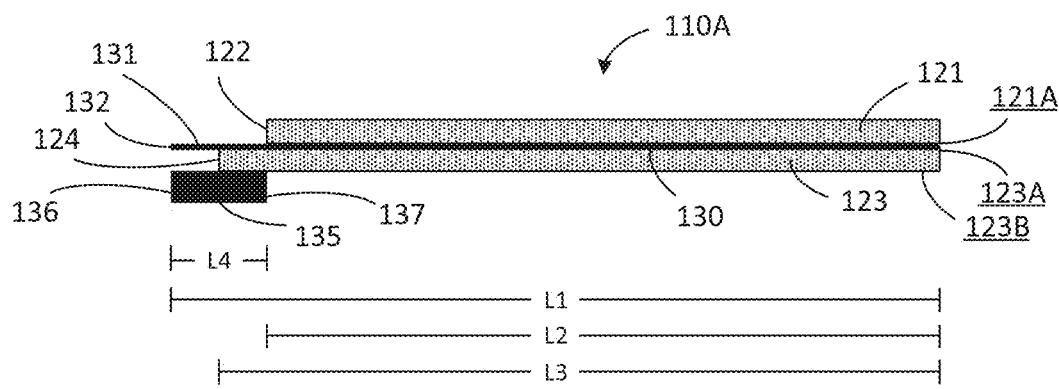
FIGS. 4A and 4B are schematic side elevation views of an anode including a support tab.
Figure 4B:
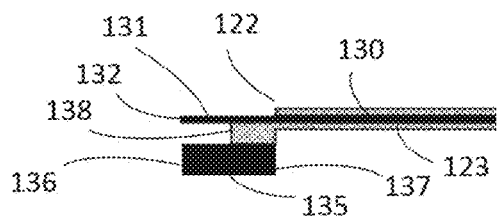

FIG. 4A illustrates an exemplary embodiment of an anode 110A designed to resolve these issues and facilitate use of copper current collectors as thin as 2 μm. The anode 110A comprises a first Li metal layer 121 having a first surface 121A in contact with a current collector 130, and a second Li metal layer 123 having a first surface 123A in contact with the current collector 130. Each Li metal layer may have a thickness 60 μm a such as a thickness within a range of 1-60 μm, 2-60 μm, 2-50 μm, 20-50 μm, or 30-50 μm prior to cycling the pouch cell. The protruding tab 131 of the current collector 130 extends past a terminal end 122 of the first Li metal layer 121 and a terminal end 124 of the second Li metal layer 123. The anode 110A further comprises a support tab 135 adhered to an opposing surface 123B of the second Li metal layer 123 adjacent to the terminal end 124 and aligned with the protruding tab 131 of the anode current collector 130. In some embodiments, if the second Li metal layer 123 is very thin, e.g., <20 μm in thickness, the anode 110A may further include a Li metal block 138 at the terminal end of Li metal layer 123, where the Li metal block 138 provides additional support for adherence of the support tab 135 (FIG. 4B). The Li metal block 138 may be a small piece of Li foil applied to the current collector prior to or after application of Li metal layer 123. In some examples, the Li metal block 138 and Li metal layer 123 together have a combined thickness 20 μm. In some embodiments, the support tab 135 has the same composition as the anode current collector 130. Thus, if the current collector is copper, the support tab is also made of copper.

The current collector 130 and protruding tab 131 have a combined length L1. The first Li metal layer has a length L2 where L2<L1. The second Li metal layer has a length L3 where L3<L1. In some embodiments, as shown in FIG. 4, L2<L3. A longer L3 facilitates attachment of the support tab 135 to the second Li metal layer 123. The support tab 135 has a length L4. A portion of the support tab 135 is adhered to the opposing surface 123B of the second Li metal layer 123. The support tab length L4 may be minimized to reduce parasitic weight. However, the length L4 is sufficient that the support tab 135 is adhered to the opposing surface 123B and extends past the terminal end 124 of the second Li metal layer 123. In some embodiments, L4 is within a range of from 2-10 mm, such from 2-8 mm, 2-5 mm, or 2-3 mm. In some embodiments, the support tab 135 has a terminal end 136 aligned with a terminal end 132 of the protruding tab 131. Advantageously when a pouch cell includes a plurality of anodes 110A, portions of the protruding tabs 131 and support tabs 135 may be adhered together to facilitate handling and electrical connections to the pouch cell. In some embodiments, a proximal end 137 of the support tab 135 is aligned with the terminal end 122 of the first Li metal layer 121. In some examples, L4 is selected so that the terminal end 136 of the support tab 135 is aligned with the terminal end 132 of the protruding tab 131 and the proximal end 137 is aligned with the terminal end 122 of the first Li metal layer 121.

Advantageously, the support tab 135 has a width substantially similar to a width of the protruding tab 131. The support tab 135 has a thickness greater than the thickness of the protruding tab 131. In some embodiments, the support tab has a thickness that is 3-6× greater than a thickness of the protruding tab, such as a support tab having a thickness of 3-18 µm, 5-15 µm, 7-12 µm, or 8-10 µm. In certain examples, the current collector 130 has a thickness of 2 µm and the support tab 135 has a thickness of 9 µm. Because resistance is inversely proportional to thickness, the support tab 135 has a much lower resistance than the protruding tab 131.

Figure 5:
FIG. 5 is a schematic cross-sectional view of the support tab.

In some embodiments, the support tab 135 is made of a perforated or dimpled material as shown in FIG. 5. The protrusions 135a facilitate adherence of the support tab 135 to the opposing surface 123B of the second Li metal layer 123. In some embodiments, no additional attachment or adhesive means is needed to adhere the support tab 135 to the opposing surface 123B of the second Li metal layer 123.

Figure 6:
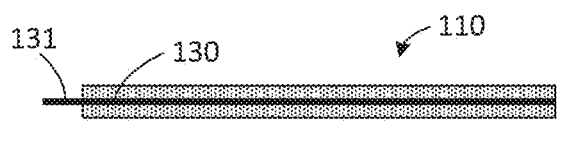
FIG. 6 illustrates circuit diagrams for anodes with and without support tabs.
Figure 6:
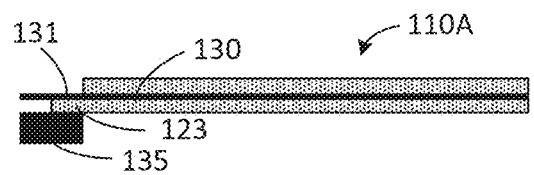
Figure 6:
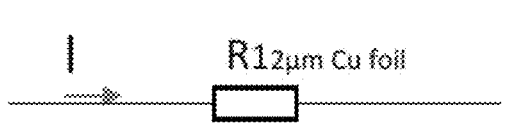
Figure 6:
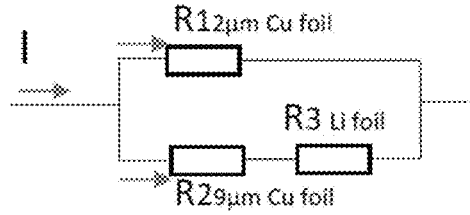

FIG. 6 shows circuit diagrams illustrating the circuit differences between an anode 110 and an anode 110A comprising a support tab 135. In an anode 110, all current I flows through the current collector 130 having a resistance R1. In the anode 110A, however, the current I is split. A portion of the current flows through the protruding tab 131 and current collector 130 having resistance R1. However, the remainder of the current flows through the support tab 135 having resistance R2, up through the second Li metal layer 123 (and/or optional Li metal block 138 if present as shown in FIG. 4B) having resistance R3, and then through the remainder of the current collector 130. Resistance is inversely proportional to thickness, and heat is proportional to resistance. Thus, a 2-µm thick copper tab will have a resistance 5× higher than a 10-µm thick copper tab and will exhibit a temperature change ~5× greater when current flows through the tab. Diverting a portion of the current through the support tab 135 reduces the amount of current flowing through the protruding tab 131. The differences in the current flows of anode 110 and anode 110A greatly reduce the temperature change occurring in the protruding tabs 131 of the current collectors 130, thereby reducing the likelihood of melting the package material of the pouch. In some examples, an anode 110 having a 2-µm thick copper current collector 130 without a support tab may exhibit a temperature change of 200-1000° C. in the protruding tab 131 when current flows through the protruding tab. In stark contrast, an anode 110A having a 2-µm thick current collector 130 and a 9-µm thick support tab 135 may exhibit an 85-90% reduction in the magnitude of the temperature change of the protruding tab 131.

Key parameters of a high specific energy (e.g., 300 Wh·kg$^{-1}$) lithium metal pouch cell include the cathode areal capacity, the ratio of anode (negative electrode) areal capacity to cathode (positive electrode) areal capacity–N/P ratio, and the ratio of electrolyte mass to cell capacity–E/C ratio, g/Ah. Each of these parameters is addressed.

Areal capacity conveniently reflects total cell capacity as long as the total electrode area is known. At a first glance, for high-energy cells, a higher areal cathode capacity (higher mass loading) theoretically provides more capacity and more energy from the cell. However, cell-level energy does not increase simply by packing more active materials into the cell because the additional weight contributes to the whole cell weight. When cell weight increases, the specific energy decreases. Thus, although increasing cathode loading generally improves cell specific energy, a saturation point is reached beyond which cell-level specific energy does not increase much further (see, e.g., Example 2, FIG. 16). This is due to simultaneous increase of total cell weight when increasing cathode loading of each layer. Additionally, as cathode loading increases, electrolyte content is increased proportionally since more electrolyte will be needed to infiltrate the additional cathode material. Increasing cathode loading with simultaneous electrolyte content increase further reduced the specific energy of the pouch cell. And, higher cathode areal capacity means deeper Li metal stripping/deposition during each cycle, which accelerates cell degradation. In some embodiments, the cathode loading is based upon the energy goal for the pouch cell and is minimized to provide the desired energy goal. In certain embodiments, the pouch cell has a cathode areal capacity within a range of 3-5 mAh/cm$^2$, such as a cathode areal capacity within a range of 3.5-5 mAh/cm$^2$.

A lithium anode as disclosed herein may have an areal capacity within a range of 0.2-10 mAh/cm$^2$, such as 1-10, 2-10, 5-10, 7-10, 8-10, or 9-10 mAh/cm$^2$. In some embodiments, a cathode as disclosed herein has a cathode areal capacity within a range of from 2 to 10 mAh/cm$^2$, such as within a range of 2-8, 2-6, 2-5, or 3-5 mAh/cm$^2$. In some embodiments, the disclosed lithium metal pouch cells have a higher N/P ratio than a Li-ion cell, such as a N/P ratio up to 6. In some embodiments, the N/P ratio is within a range of 0.02-5, 0.1-5, 0.5-5, 1-5, 1.5-5, 2-5, 2-3, 2.3-3, or 2.5-3. In certain embodiments, a N/P ratio of 2 or greater provides an increased amount of Li metal to help ensure sufficient Li in the cell due to the continuous reaction between Li and the electrolyte. For example, a commercially available 50 µm lithium foil may have an areal capacity of 9-10 mAh/cm$^2$, such as an areal capacity of 10 mAh/cm$^2$. Thus, in combination with a cathode areal capacity within a range of 2-6 mAh/cm$^2$, the N/P ratio may be 1.6-5. In contrast, a typical N/P ratio in commercial Li ion cells is ~1.1.

Unlike in Li-ion batteries, there is no stable passivation film formed on the anode, i.e., Li metal surface. Continuous side reactions between electrolyte and Li metal occur during each cycle, which depletes the electrolyte and lithium and results in non-uniform Li deposition as ill-defined fibrous Li dendrites, leading to a short cell lifespan. While excess electrolyte ("flooded" electrolyte conditions) benefits cycling life, cell specific energy decreases rapidly as the cell weight increases. Indeed, when the cathode areal capacity is within a range of 2-10 mAh/cm$^2$, a cell specific energy of 300 Wh/kg can be obtained when the electrolyte/capacity (E/C) ratio is within a range of 1-6 g/Ah, such as within a range of 2-6 g/Ah or 2-4 g/Ah. As the E/C ratio increases, the maximum specific energy of the pouch cell falls below 300 Wh/kg, regardless of the cathode areal capacity. In some embodiments, the pouch cell has an E/C ratio within a range of 2-4 g/Ah. In certain embodiments, the E/C ratio is 2-3.5 g/Ah or 2-3 g/Ah.

Figure 7:
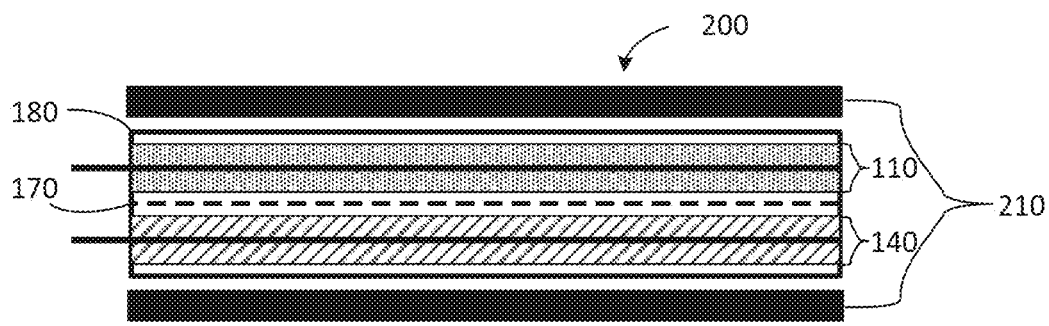
FIG. 7 is a schematic side elevation view of a simplified pouch cell system including an external pressure-applying device.

A key issue present in Li metal pouch cells is cell swelling due to swelling of the anode as it is cycled. As the pouch cell is cycled through an initial 50 cycles, the flat lithium foil electrode is converted into larger Li particles entangled within the solid electrolyte interphase, leading to a rapid anode volume expansion (e.g., 45-50% increase in cell thickness). In some embodiments, swelling is mitigated by application of low, but uniform external pressure. FIG. 7 shows an exemplary lithium metal pouch system 200 including a lithium metal pouch cell comprising an anode 110, a cathode 140, a separator 170, a packaging material defining a pouch 180 enclosing the anode 110, cathode 140, and separator 170, and an external pressure-applying device 210 configured to apply a compression force to the lithium metal pouch cell. In certain embodiments, the compression force is up to 105 kPa (5 psi), such as a compression force within a range of 35 to 105 kPa (5 to 15 psi), such as 50-90 kPa, or 60-80 kPa. In some examples, the compression force is 70 kPa (10 psi). Application of external pressure helps the Li anode maintain good contact between Li particles, ensuring a percolation pathway for both ions and electrons, thus the electrochemical reactions continue to occur. Accordingly the solid Li particles evolve into a porous structure, manifesting significantly reduced cell swelling. In some embodiments, further swelling is limited to 25%, such as 20% after the initial 50 cycles. In one example, further swelling was limited to 19% over 150 subsequent cycles. It is understood that the Li metal pouch cell in the system of FIG. 7 may include multiple layers of anodes and cathodes with separators between each adjacent anode and cathode, as previously discussed.

Advantageously, the pouch cell components and the masses of each component provide a desired specific energy of the pouch cell and/or minimize parasitic weight of inactive components. Embodiments of the disclosed Li metal pouch cells comprise a lithium anode (e.g., anode 110 of FIGS. 1, 2) comprising an anode current collector 130 and a lithium layer 120 on each side of the anode current collector. In some embodiments, the anode current collector 130 is copper, such as a copper foil or copper mesh. As previously discussed, it is advantageous to reduce the parasitic weight of the current collector, e.g., by reducing the thickness. In some embodiments, the anode current collector has a thickness within a range of from 50 nm to 10 µm, such as from 0.1-10 µm, 0.5-10 µm, 1-10 µm, 1-8 µm, 1-5 µm, 1-3 µm, or 2-3 µm. When the current collector is very thin, e.g., 50 nm-3 µm, it may be advantageous to further include a support tab 135 adhered to a surface 123B of a lithium layer 123 (e.g., as shown in FIGS. 4A, 4B, and 5), where the support tab 135 comprises copper and has a greater thickness than the current collector, such as a thickness 3-6× greater than the current collector. In some embodiments, each lithium layer has a thickness within a range of 1-60 µm, such as within a range of 2-60 µm, 2-60 µm, 20-60 µm, 30-60 µm, or 40-60 µm, prior to cycling the pouch cell. In one embodiment, a lithium anode comprises a 5-8 µm copper current collector and two layers of lithium, each lithium layer having a thickness within a range of 40-60 µm. In an independent embodiment, a lithium anode comprises a 50 nm to 3 µm copper current collector, two lithium layers with each layer having a thickness within a range of 1-60 µm prior to cycling the pouch cell, and a copper support tab having a thickness within a range of 3-18 µm, such as within a range of 7-12 µm. In some embodiments, the lithium metal comprises from 1-10 wt % of the pouch cell, such as from 4-10 wt % or 5-6 wt % of the pouch cell. The anode current collector and optional support tab may comprise from 5-10 wt % of the pouch cell, such as from 7-8 wt %.

The cathode may be any cathode suitable for use in a Li metal pouch cell. In some embodiments, such as those shown in FIGS. 1 and 2, the cathode 140 comprises a cathode current collector 160 and a layer of cathode material 150 on each side of the cathode current collector. The cathode material comprises a cathode active material and non-active materials, such as carbon and/or one or more binder(s). The cathode active material is a material capable of intercalating or inserting Li ions reversibly without an irreversible change in its microstructure. Parasitic weight of the cathode may be reduced, in part, by selecting a light-weight current collector, minimizing the amount of inactive materials (e.g., carbon, binder) in the cathode material, selecting an amount of cathode active material to complement the anode, and combinations thereof. In some embodiments, the cathode current collector comprises aluminum, such as Al foil or mesh. The cathode current collector may have a thickness within a range of from 8-20 µm, such as from 10-15 µm. In some embodiments, each layer of cathode material has a thickness within a range of 50-200 µm, such as within a range of 50-150 µm, 50-100 µm, or 60-80 µm. Advantageously, the amount of inactive material in each cathode material layer is minimized to reduce parasitic weight and/or maximize the areal capacity of the cathode. In some embodiments, each cathode material layer independently comprises >80 wt %, >85 wt %, or >90% cathode active material, such as from 80-96 wt % 85-96 wt %, or 90-96 wt % cathode active material, with the remainder of the mass comprising carbon and/or a binder. In one non-limiting, a cathode active material comprises 96 wt % LiNi$_{0.6}$Mn$_{0.2}$Co$_{0.2}$O$_2$ (NMC622) and 4 wt % carbon/binder. Suitable cathode active materials include, but are not limited to, LiNi$_x$Mn$_y$Co$_z$O$_2$ (NMC, x+y+z=1), Li$_{1+w}$Ni$_x$Mn$_y$Co$_z$O$_2$ (x+y+z+w=1, 0≤w≤0.25), LiCoO$_2$ (LCO), LiNi$_{0.8}$Co$_{0.15}$Al$_{0.05}$O$_2$ (NCA), LiNi$_{0.5}$Mn$_{1.5}$O$_4$ spinel, LiMn$_2$O$_4$ (LMO), LiFePO$_4$ (LFP), Li$_{4-x}$M$_x$Ti$_5$O$_{12}$ (M=Mg, Al, Ba, Sr, or Ta; 0≤x≤1), MnO$_2$, V$_2$O$_5$, V$_6$O$_{13}$, LiV$_3$O$_8$, LiM$^{C1}_x$M$^{C2}_{1-x}$PO$_4$ (M$^{C1}$ or M$^{C2}$=Fe, Mn, Ni, Co, Cr, or Ti; 0≤x≤1), Li$_3$V$_{2-x}$M$^1_x$(PO$_4$)$_3$ (M$^1$=Cr, Co, Fe, Mg, Y, Ti, Nb, or Ce; 0≤x≤1), LiVPO$_4$F, LiM$^{C1}_x$M$^{C2}_{1-x}$O$_2$ (M$^{C1}$ and M$^{C2}$ independently are Fe, Mn, Ni, Co, Cr, Ti, Mg, or Al; 0≤x≤1), LiMC$^1_x$M$^{C2}_y$M$^{C3}_{1-x-y}$O$_2$ ((M$^{C1}$, M$^{C2}$, and M$^{C3}$ independently are Fe, Mn, Ni, Co, Cr, Ti, Mg, or Al; 0≤x≤1; 0≤y≤1), LiMn$_{2-y}$X$_y$O$_4$ (X=Cr, Al, or Fe, 0≤y≤1), LiNi$_{0.5-y}$X$_y$Mn$_{1.5}$O$_4$ (X=Fe, Cr, Zn, Al, Mg, Ga, V, or Cu; 0≤y<0.5), xLi$_2$MnO$_3$·(1-x)LiM$^{C1}_y$M$^{C2}_z$M$^{C3}_{1-y-z}$O$_2$ (M$^{C1}$, M$^{C2}$, and M$^{C3}$ independently are Mn, Ni, Co, Cr, Fe, or mixture thereof; x=0.3-0.5; y≤0.5; z≤0.5), Li$_2$M$^2$SiO$_4$ (M$^2$=Mn, Fe, or Co), Li$_2$M$^2$SO$_4$ (M$^2$=Mn, Fe, or Co), LiM$^2$SO$_4$F (M$^2$=Fe, Mn, or Co), Li(Fe$_{1-y}$Mn$_y$)P$_2$O$_7$ (0≤y≤1), Cr$_3$O$_8$, Cr$_2$O$_5$, a carbon/sulfur composite, Li$_2$O$_2$, Li$_2$S, LiF, or any combination thereof. In some embodiments, the cathode active material comprises LiNi$_x$Mn$_y$Co$_z$O$_2$ (NMC, x+y+z=1), Li$_{1+w}$Ni$_x$Mn$_y$Co$_z$O$_2$ (x+y+z+w=1, 0≤w≤0.25), or a combination thereof. Exemplary cathode active materials include, but are not limited to, NMC622 (LiNi$_{0.6}$Mn$_{0.2}$Co$_{0.2}$O$_2$) and NMC811 (LiNi$_{0.8}$Mn$_{0.1}$Co$_{0.1}$O$_2$). In some embodiments, the cathode material (cathode active material and inactive materials, such as carbon and/or binder) comprises from 40-60 wt % of the pouch cell, such as from 40-50 wt % of the pouch cell. The cathode current collector may comprise from 2-6 wt % of the pouch cell, such as from 3-4 wt % of the pouch cell.

Embodiments of the disclosed Li metal pouch cells include an electrolyte comprising a lithium active salt and a solvent. In some embodiments, the electrolyte comprises from 20-30 wt % of the pouch cell, such as from 20-25 wt % of the pouch cell. In some embodiments, the lithium active salt comprises LiPF$_6$, LiAsF$_6$, LiBF$_4$, lithium bis(fluorosulfonyl)imide (LiFSI), lithium bis(trifluoromethanesulfonyl)imide (LiTFSI), lithium bis(oxalato)borate (LiB(C$_2$O$_4$)$_2$, LiBOB), lithium difluoro(oxalato)borate (LiBF$_2$(C$_2$O$_4$), LiDFOB), lithium bis(pentafluoroethanesulfonyl)imide (LiN(SO$_2$CF$_2$CF$_3$)$_2$, LiBETI), lithium (fluorosulfonyl trifluoromethanesulfonyl)imide (LiN(SO$_2$F)(SO$_2$CF$_3$), LiFTFSI), lithium (fluorosulfonyl pentafluoroethanesulfonyl)imide (LiN(SO$_2$F)N(SO$_2$CF$_2$CF$_3$), LiFBETI), lithium cyclo(tetrafluoroethylenedisulfonly)imide (LiN(SO$_2$CF$_2$CF$_2$SO$_2$), LiCTFSI), lithium (trifluoromethanesulfonyl)(n-nonafluorobutanesulfonyl)imide (LiN(SO$_2$CF$_3$)(SO$_2$-n-C$_4$F$_9$), LiTNFSI), lithium cyclo-hexafluoropropane-1,3-bis(sulfonyl)imide, or any combination thereof. The solvent is any nonaqueous solvent suitable for use with the lithium active salt, lithium metal anode, and packaging material. Exemplary solvents include, but are not limited to, triethyl phosphate, trimethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, 1,2-dimethoxyethane (DME), 1,3-dioxolane (DOL), tetrahydrofuran (THF), allyl ether, dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (vinyl ethylene carbonate, VEC), 4-methylene-1,3-dioxolan-2-one (methylene ethylene carbonate, MEC), 4,5-dimethylene-1,3-dioxolan-2-one, dimethyl sulfoxide (DMSO), dimethyl sulfone (DMS), ethyl methyl sulfone (EMS), ethyl vinyl sulfone (EVS), tetramethylene sulfone (i.e. sulfolane, TMS), trifluoromethyl ethyl sulfone (FMES), trifluoromethyl isopropyl sulfone (FMIS), trifluoropropyl methyl sulfone (FPMS), diethylene glycol dimethyl ether (diglyme), triethylene glycol dimethyl ether (triglyme), tetraethylene glycol dimethyl ether (tetraglyme), methyl butyrate, ethyl propionate, gamma-butyrolactone, acetonitrile (AN), succinonitrile (SN), adiponitrile, triallyl amine, triallyl cyanurate, triallyl isocyanurate, or any combination thereof. In some embodiments, the solvent comprises a flame retardant compound. The flame retardant compound may comprise the entire solvent. Alternatively, the solvent may comprise at least 5 wt % of the flame retardant compound in combination with one or more additional solvents and/or diluents. Exemplary flame retardant compounds include, but are not limited to, triethyl phosphate, trimethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, and combinations thereof. In some embodiments, the electrolyte has a lithium active salt concentration within a range of from 0.5-8 M, such as a concentration within a range of 1-8 M, 1-6 M, or 1-5 M. In some examples, the electrolyte comprises LiPF$_6$ in a carbonate solvent, such as 1.0 M LiPF$_6$ in EC/EMC. In one example, the electrolyte was 1.0 M LiPF$_6$ in EC/EMC (3:7 by wt.)+2 wt % VC.

In some embodiments, the electrolyte is a localized superconcentrated electrolyte (LSE), also referred to as a localized high concentration electrolyte. A LSE includes an active salt, a solvent in which the active salt is soluble, and a diluent, wherein the active salt has a solubility in the diluent at least 10 times less than a solubility of the active salt in the solvent. In an LSE, lithium ions remain associated with solvent molecules after addition of the diluent. The anions are also in proximity to, or associated with, the lithium ions. Thus, localized regions of solvent-cation-anion aggregates are formed. In contrast, the lithium ions and anions are not associated with the diluent molecules, which remain free in the solution. In an LSE, the electrolyte as a whole is not a concentrated electrolyte, but there are localized regions of high concentration where the lithium cations are associated with the solvent molecules. There are few to no free solvent molecules in the diluted electrolyte, thereby providing the benefits of a superconcentrated electrolyte without the associated disadvantages. The solubility of the active salt in the solvent (in the absence of diluent) may be greater than 3 M, such as at least 4 M or at least 5 M. In some embodiments, the solubility and/or concentration of the active salt in the solvent is within a range of from 3 M to 10 M, such as from 3 M to 8 M, from 4 M to 8 M, or from 5 M to 8 M. However, in some embodiments, the molar concentration of the active salt in the LSE as a whole is within a range of 0.5 M to 3 M, 0.5 M to 2 M, 0.75 M to 2 M, or 0.75 M to 1.5 M.

Exemplary salts and solvents for LSEs are those disclosed above. In some embodiments, the diluent comprises a fluoroalkyl ether (also referred to as a hydrofluoroether (HFE)), a fluorinated orthoformate, or a combination thereof. Exemplary diluents include, but are not limited to, 1,1,2,2-tetrafluoroethyl-2,2,3,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), tris(2,2,2-trifluoroethyl)orthoformate (TFEO), tris(hexafluoroisopropyl) orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof. In certain embodiments where the diluent and solvent are immiscible, the electrolyte may further include a bridge solvent having a different composition than the solvent and a different composition than the diluent, wherein the bridge solvent is miscible with the solvent and with the diluent. Exemplary bridge solvents include acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), or any combination thereof. Additional information regarding LSEs may be found in US 2018/0254524 A1, US 2018/0251681 A1, and US 2019/148775 A1, each of which is incorporated in its entirety herein by reference. In some examples, the electrolyte comprises 1.2 M LiFSI in TEP/BTFE (1:2 molar ratio) or 1.5 M LiFSI in DME/TTE.

Embodiments of the disclosed Li metal pouch cells further include a separator. In some embodiments, the pouch cell includes a separator between each adjacent anode and cathode. In certain embodiments, the separator comprises from 2-5 wt % of the pouch cell, such as from 2.5-3.5 wt % of the pouch cell. The separator may be glass fiber, a porous polymer film (e.g., polyethylene- or polypropylene-based material) with or without a ceramic coating, or a composite (e.g., a porous film of inorganic particles and a binder). Exemplary polymeric separators include, but are not limited to, a Celgard® K1640 polyethylene (PE) membrane, a Celgard® 2500 polypropylene membrane, and a Celgard® 3501 surfactant-coated polypropylene membrane. The separator may be infused with an electrolyte, as disclosed herein.

Embodiments of the disclosed Li pouch cells also comprise a packaging material defining a pouch enclosing the anode, cathode, electrolyte, and separator. The packaging material may comprise from 5-10 wt % of the pouch cell, such as from 7-9 wt % of the pouch cell. Exemplary packaging materials include, but are not limited to, aluminum laminate films (e.g., comprising one or more layers of Al together with one or more layers of polyethylene terephthalate (PET), polyethylene, polypropylene, polyamide, polyester, adhesive, and combinations thereof). In some embodiments, the packaging material has a thickness within a range of from 70-200 μm, such as from 70-150 μm.

In some embodiments, a Li metal pouch cell as disclosed herein has a specific energy of 300 Wh/kg, such as a specific energy 350 Wh/kg. The Li metal pouch cell may have a specific energy within a range of 300-500 Wh/kg, such as 350-500 Wh/kg. In certain embodiments, the lithium metal pouch cell has a capacity 1 Ah and a specific energy of 300 Wh/kg, and exhibits 70% capacity retention after 50 cycles, such as 70% capacity retention after 100 cycles, 150 cycles, 200 cycles, 250 cycles, 500 cycles, or even 1000 cycles. The lithium metal pouch cell may exhibit 80% capacity retention after 50 cycles, 100 cycles, 150 cycles, 200 cycles, 250 cycles, 500 cycles, or even 1000 cycles. In some embodiments, application of an external compression force (e.g., 70 kPa) to the Li metal pouch cell enhances capacity retention and/or cycle life compared to a comparable Li metal pouch cell without external compression.

III. METHOD OF MAKING A LITHIUM METAL POUCH CELL

Embodiments of the disclosed lithium metal pouch cells are made by assembling one or more anodes, one or more cathodes, one or more separators, and an electrolyte within a packaging material. Anode materials are commercially available. For example, an 8-μm copper foil coated with 50 μm lithium metal foil on both sides is available commercially. Suitable cathodes are available commercially or can be fabricated. For example, a cathode material slurry comprising 80 wt % cathode active material, conductive carbon, binder, and a suitable solvent may be coated onto a cathode current collector, such as aluminum foil. In some embodiments, the cathode is calendared to achieve a desired cathode material density and then dried to remove solvent. Suitable separators and packaging materials are commercially available. At least one cathode, one separator, and one anode are enclosed within a pouch comprising a suitable packaging material, e.g., as shown in FIG. 1. In a multilayered pouch cell, such as the pouch cell of FIG. 2, layers comprising alternating cathodes and anodes with a separator between each cathode and anode are stacked and enclosed within a pouch comprising a suitable packaging material. Advantageously, the cathodes and anodes include protruding tabs, which extend outside the pouch (FIG. 3). The packaging material is vacuum sealed around the stacked cathodes, anodes, and separators, and electrolyte is injected into the pouch. The external protruding anode tabs may be welded together. The external protruding cathode tabs are similarly welded. Electrical connections (e.g., nickel or aluminum tabs) are welded to the protruding tabs. In some embodiments where the anode current collectors are very thin (e.g., 1-3 μm thick), support tabs may be adhered to the anode as shown in FIG. 4 prior to pouch cell assembly. The anode protruding tabs and support tabs are welded together to provide sufficient mechanical stability.

IV. TESTING PROTOCOL

Variations in testing protocols make it difficult to accurately compare and benchmark materials and concepts in development of Li metal cells, and more specifically Li metal pouch cells. Moreover, the test conditions in coin cells often are not comparable to operating conditions of a pouch cell.

Embodiments of a coin cell testing protocol suitable for predicting performance of a Li metal pouch cell are disclosed. The testing protocol employs specific conditions for evaluating the properties and/or cycle life of Li metal and Li metal cells, including Li metal pouch cells as disclosed herein. In some embodiments, the testing protocol is suitable for use in a multilayered Li pouch cell (e.g., as shown in FIG. 2) having a specific energy 300 Wh/kg.

Testing parameters to consider when using a coin cell to mimic a pouch cell include cathode areal capacity, anode areal capacity, N/P ratio, electrolyte composition, E/C ratio, temperature, voltage range, current density, and combinations thereof. In some embodiments, the cathode areal capacity is within a range of 3-5 mAh/cm$^2$, such as 3.5-5 mAh/cm$^2$. A lithium foil anode typically has an areal capacity of 9-11 mAh/cm$^2$, such as 9.5-10.5 mAh/cm$^2$. Thus, in some embodiments, the N/P ratio is 3.5 or 3, such as within a range of 2-3.5, 2-3 or 2.5-3. To achieve a high specific energy, the E/C ratio may be 4 g/Ah or 3 g/Ah, such as an E/C ratio within a range of 2-4 g/Ah, 2-3.5 g/Ah or 2-3 g/Ah. The temperature may be any suitable temperature. Conveniently, testing is often performed at ambient temperature, such as a temperature of 20-25° C. A suitable voltage range may be from 2-4.4 V, such as from 2.5-4.4 V or 2.8-4.4 V. Current density will depend on the research objectives. In some embodiments, the current density may range from C/10 to 1 C. In certain embodiments, a slow charge (e.g., C/10) is utilized.

In some embodiments where a testing protocol for a Li metal pouch cell with a specific energy on the order of 300 Wh/kg is desired, the testing protocol may employ a coin cell including an NMC cathode with a loading of at least 3.5 mAh/cm$^2$, such as an NMC622 cathode or other similar cathode with a similar average discharge voltage, a Li metal layer having a thickness of ≤50 μm, and an electrolyte with an electrolyte/cathode (E/C) ratio 3 g/Ah.

Table 1 provides suitable parameters for one exemplary coin cell for testing materials and concepts in development of Li metal pouch cells having a specific energy of 300 Wh/kg.

TABLE 1

| NMC622 Cathode[1] | Areal Capacity (mAh/cm$^2$) | 3.5 |
|---|---|---|
| | Electrode Thickness (μm) | ca. 70 |
| Li Metal Anode | Areal Capacity (mAh/cm$^2$) | 10 |
| | Electrode Thickness (μm) | 50 |
| | N/P Ratio | 2.86 |
| Electrolyte[2] | Composition | 1.0M LiPF$_6$ in EC-EMC (3:7 by wt) + 2.0 wt % VC |
| | E/C Ratio (g/Ah) | 3 |
| Polyethylene Membrane Separator[3] | Thickness (μm) | 20 |
| Testing Conditions | Temperature (° C.) | 25 |
| | Minimum Resting Time (h)[4] | 4 |
| | Voltage Range (V) | 2.8-4.4 |
| | Current Density (mA/cm$^2$) | Varies[5] |

[1]Cathode disks were dried, e.g., in a vacuum oven at 120° C. overnight before use.
[2]Electrolyte constituents may be varied based on research objectives.
[3]Polyethylene separators are commonly used in coin cells.
[4]Minimum resting time is the time between assembling and testing the cell.
[5]Current density will vary based on research objectives. A low charge rate, e.g., C/10, is suggested for fundamental studies except rate capability testing.

V. EXAMPLES

General Methods

Preparation of cathode.

LiNi$_{0.6}$Mn$_{0.2}$Co$_{0.2}$O$_2$ (NMC622) was received from EcoPro Inc. The cathode slurry was prepared by mixing 96 wt % NMC622, 2 wt % conductive carbon (C65, TIMCAL), and 2 wt % PVDF binder (Kureha) in methylpyrrolidone (NMP) solution. Then, the slurry was coated onto both sides of 12 μm-thick Al foil by using a coating machine (Media Tech. Co., Ltd.). After coating, the cathode was calendared to control the press density at 3.0 g cm$^{-3}$ and then punched into rectangular pieces (36 mm×54 mm), and dried in a vacuum oven (70° C., 24 hours) prior to cell assembly.

Preparation of Li metal anode.

Li foil (50±2 μm-thick Li metal on both sides of 8 μm-thick Cu foil) was received from China Energy Lithium Co., Ltd. Li foil was punched into rectangular pieces (37.5 mm×55.5 mm) in the Dry Room (0.1 RH %, 19° C.) of Advanced Battery Facility Lab in Pacific Northwest National Laboratory (PNNL) prior to cell assembly.

Electrolyte.

For conventional electrolyte, 1.0 M LiPF$_6$ in EC/EMC (3:7 by wt.)+2 wt % VC, 1.0 M lithium hexafluorophosphate (LPN was dissolved in ethylene carbonate (EC) and ethyl methyl carbonate (EMC) solvent mixture (30:70 by weight ratio) with 2 wt % vinylene carbonate (VC) additive; battery-grade LiPF$_6$, EC, EMC, and VC were purchased from BASF. The 1.2 M LiFSI in TEP/BTFE (1:2 by molar ratio) compatible electrolyte was prepared by dissolving 1.2 M lithium bis(fluorosulfonyl) imide (LiFSI, Nippon Shokubai) into the solvent mixture of triethyl phosphate (TEP, Sigma Aldrich, ReagentPlus >99.8%) and bis(2,2,2-trifluoroethyl) ether (BTFE, SynQuest Labs, 99%) with a molar ratio of LiFSI:TEP:BTFE at 0.75:1:2. All procedures were performed in an MBraun LABmaster glovebox filled with purified argon gas (<0.1 ppm O$_2$ and <0.1 ppm H$_2$O).

Li metal pouch cell assembly.

Pouch cell assembly was performed with a semi-automated cell manufacturing line (Media Tech. Co., Ltd.), which is composed of Z-stacking machine of cathode, anode, and separator; Grid-trim; ultrasonic welding for connection with Al (cathode) and Ni (anode) external tabs; packaging; and vacuum sealing with electrolyte injection. All Li metal pouch cells were assembled in the Dry Room (0.1 RH %, 19° C.) of Advanced Battery Facility Lab in Pacific Northwest National Laboratory (PNNL).

Characterization.

For the sample preparation, both cycled NMC622 cathode and Li anode were obtained by disassembling the cycled pouch cells inside the glovebox and were immediately rinsed with pure EMC to remove the residual electrolyte, and then dried under vacuum. Samples were hermetically sealed inside an air-tight bottle for transferring. Scanning electron microscope (SEM) images were collected with Helios focused ion beam SEM (FEI, USA) at 5 kV and 0.19 nA. Scanning transmission electron microscope (STEM) images were carried out on an FEI Titan® STEM. X-ray diffraction (XRD) analysis was performed with (Rigaku MiniFlex II XRD, Japan) using Cu Kα radiation (30 kV and 15 mA), recorded from 10° to 80°.

Electrochemical testing.

The pouch cell was sandwiched between two pieces of silicon foam (from USA SEALING) and placed in a clamping device for testing. The compression force deflection (CFD) of the silicon foam is 10 psi (70 kPa) above which permanent deformation of the silicon foam happens i.e., the foam cannot recover to its original format. By adjusting the distances of the two PolyEther Ether Ketone (PEEK) plates of the clamping device, the pressure applied on the pouch cell before and during cycling is adjusted to approach CFD, i.e., 10 psi (70 kPa) before foam deform happens. The silicon foam not only improves the testing safety but more importantly ensures the homogeneity of the pressure applied on the pouch cell. However, during cycling of Li metal pouch cells, the exact pressure and its change during cycling are still unknown at the current stage due to cell swelling. All pouch cells were tested in gas-detecting safety chamber (Cincinnati Sub-Zero) filled with inner gas at 25° C. Cycling performance tests were carried out with battery testers (LANHE CT2001 B, Type: 5V-10A-8C-110V). All batteries were tested in the voltage range of 2.7~4.4 V under constant current (CC)-constant voltage (CV) charge and CC discharge modes; the CV charge process was initiated when the charge voltage reached the cut-off (4.4 V) and terminated until the charge current decayed to C/20.

Example 1

Li∥NMC622 Coin Cell

Positive electrodes were 96 wt % LiNi$_{0.6}$Mn$_{0.2}$Co$_{0.2}$O$_2$ (NMC622 from EcoPro, Korea), 2 wt % polyvinylidene difluoride (PVdF) binder, and 2 wt % conductive carbon additive on 15 μm Al foil. The electrodes were pressed to an electrode density of ~3.0 g/cm$^3$ after the coating and drying, and then cut into disks with an area of 1.27 cm$^2$ for coin cell testing. The negative electrode was either a 250 μm freestanding Li chip (MTI Corporation) or 50 μm Li coated on Cu foil (China Energy Lithium Co., Ltd.) with diameter of 1.45 cm. Polyethylene (PE) separators (20 μm thickness) and CR2032 type coin cell cases (MTI Corporation) were used for cell assembly and tests. The electrolyte was 1.0 M LiPF$_6$ in a 3:7 by weight ethylene carbonate (EC)-ethyl methyl carbonate (EMC) mixture with an additional 2 wt % vinylene carbonate (VC) (BASF). The amount of electrolyte (g/Ah) added was calculated by estimating the total capacity of the cathode based on a specific capacity of 180 mAh/g for NMC622. A relative volume of electrolyte quantified based on an electrolyte density of 1.2 g/cm$^3$ was added to each cell using high-precision pipettes. The practical specific capacity of the NMC622 material was measured to be ~210 mAh/g for the first charge to 4.4 V vs. Li and ~190 mAh/g for discharge to 2.8 V vs. Li at a constant current rate of C/10 (1 C=180 mA/g NMC622). After two formation cycles at C/10, the cells were charged/discharged without rest at the desired constant C rate between 4.4 and 2.8 V with an additional constant-voltage charge step by maintaining them at 4.4 V until the charge current dropped down to C/20. All of the tests were done in a 25° C. chamber.

Cells were prepared with various NMC622 cathode loadings, Li anode thicknesses, and electrolyte contents. FIGS. 8-11 show the variation of cycle life in the Li∥NMC622 coin cells as a function of electrolyte amount (FIG. 8—cathodes ~3.8 mAh/cm$^2$ and 250 μm Li foil anodes), Li anode thickness (FIG. 9—cathodes ~3.5 mAh/cm2 and 50 μm Li anodes), cathode loading (FIG. 10—cathodes of various areal loadings and 50 μm Li anodes with 100 μL electrolyte), and long cycle life under unconstrained conditions (FIG. 11—cathode ~0.45 mAh/cm$^2$, and 250 μm Li foil anode with 100 μL of electrolyte at 2 C charge and discharge after initial formation cycle at C/10). In comparison, in a commercial Li-ion cell, the electrolyte is about 1.3 g electrolyte/Ah. In contrast the amount of electrolyte used in common coin cell tests can be as high as ~100 g/Ah (assuming 100 μL electrolyte and total cathode loading of 1 mAh), more than 75 times higher than in a coin cell. A large amount of electrolyte normally favors a long cycle life of Li metal.

Figure 8:
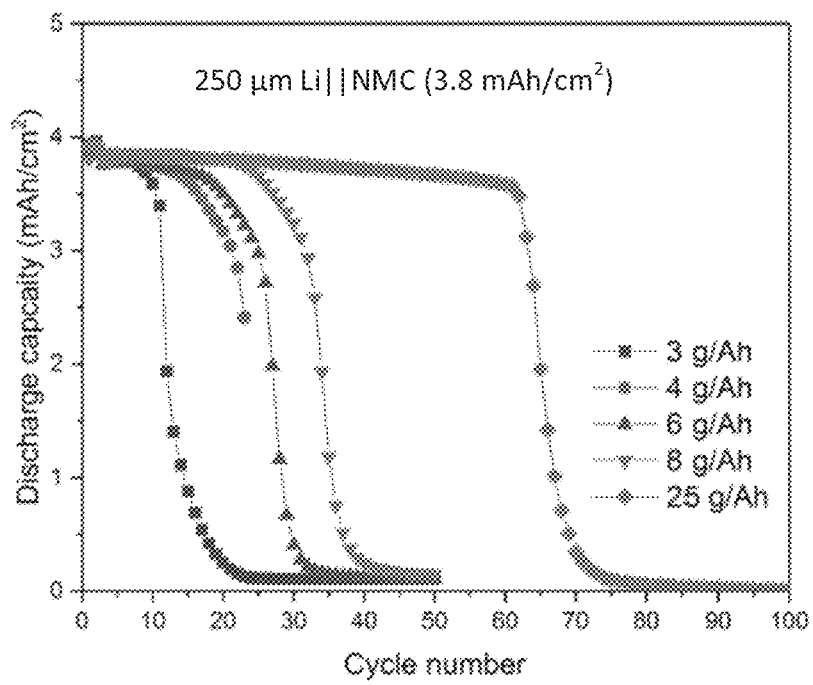
FIG. 8 is a graph showing variation of cycle life in a Li∥NMC622 coin cell as a function of electrolyte amount.

FIG. 8 shows that in a lean electrolyte condition, i.e., 3 g/Ah, only ~12 stable cycles are obtained in coin cell testing using the same cathode loading of ca. 3.5 mAh/cm$^2$ and a thick 250 μm Li foil (50 mAh/cm$^2$ of Li. After 12 cycles, the capacity of the coin cell tested drops quickly to almost zero, even though the thick Li anode provides more than sufficient Li. The cycling stability is proportional to the electrolyte amount. The stable cycle life (based on 80% capacity retention) can be improved to ~21, 26, and 32 cycles by increasing the electrolyte amount to 4, 6, and 8 g/Ah, respectively. Further increasing the electrolyte to 25 g/Ah (100 μL) will push the limit to about 65 cycles, but will sacrifice the practical cell specific energy and is not suitable for real-world applications of Li metal cells. Unlike a Li-ion cell, where a stable protective solid electrolyte interphase (SEI) layer forms on a graphite anode, aggressive reactions between the electrolyte and Li metal anode continue to occur. The early failure with a limited amount of electrolyte is related to continuous irreversible consumption of electrolyte during each cycle by forming a mossy SEI layer on the Li metal. If more electrolyte is added to a coin cell, longer cycling occurs so long as there is still a sufficient amount of active Li and the SEI layer has not accumulated to a critical level. Thus, it is hard to conclude whether observed improvement of cell performance is from incorporation of new approaches or simply from variations in electrolyte content in the coin cells.

Figure 9:
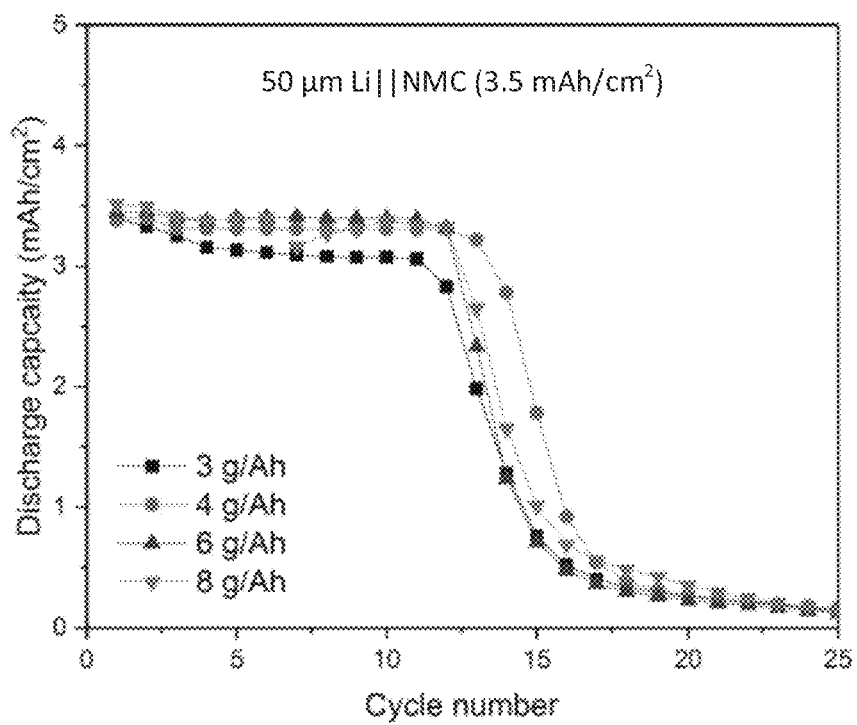
FIG. 9 is a graph showing variation of cycle life in a Li∥NMC622 coin cell as a function of anode thickness.
Figure 12:
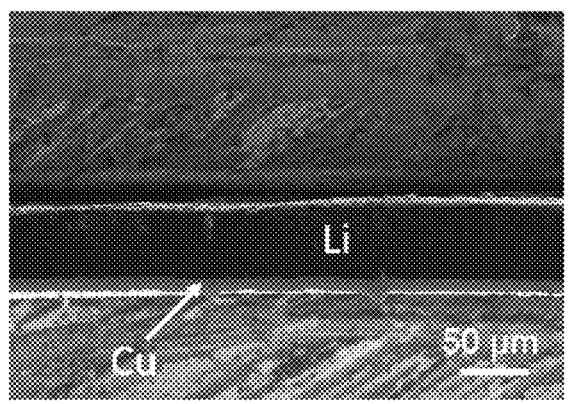
FIG. 12 is a cross-sectional scanning electron microscope (SEM) image of pristine Li before cycling in a Li∥NMC622 coin cell having a 50 μm Li metal anode, a cathode loading of 3.5 mAh/cm$^2$, and 8 g/Ah of electrolyte.
Figure 13:
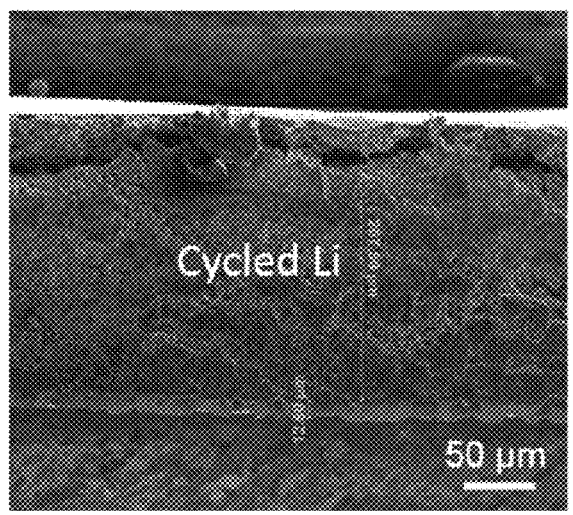
FIG. 13 is a cross-sectional SEM image of the Li metal anode after cycling in the coin cell of FIG. 12.
Figure 14:
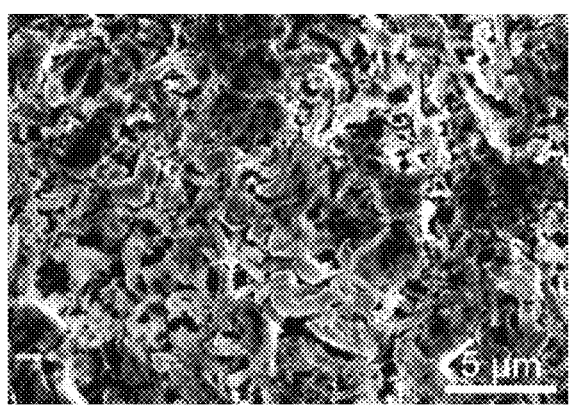
FIG. 14 is a top view SEM image of the Li metal anode of FIG. 13.

If there is sufficient electrolyte, a thick Li metal anode usually displays a longer cycling life than a thinner Li metal anode. However, FIG. 9 shows that when the Li thickness is reduced from 250 μm to 50 μm while keeping the cathode loading at the same level (3.5 mAh/cm$^2$), the cycle life is drastically reduced to only 12-14 stable cycles, regardless of how much electrolyte is in the cell. Under these conditions, cycled electrode and separator in the cell with 8 g/Ah of electrolyte remain wetted, implying that the electrolyte is not depleted. However, the Li Anode, originally 50 μm thick (FIG. 12), harvested from the cell with 8 g/Ah electrolyte has expanded to ~210 μm thick (FIG. 13) and is completely porous (FIG. 14). Since all of the cells in FIG. 9 included a 50 μm Li metal anode and failed after approximately the same limited number of cycles, the results suggest that the main failure mechanism was Li consumption due to continuous SEI growth and the isolation of Li particles, producing electrochemically inactive or "dead" Li that does not participate in the electrochemical reaction anymore. The average formation speed of inactive Li was about 8.3% (100%/12=8.3%) per cycle. Inactive Li is defined as any form of Li that does not participate in the reversible electrochemical process. It includes not only Li consumed to build SEI layers, but also the isolated metallic Li that completely loses electronic contact with the rest. To reach 100 stable cycles, the average percentage of inactive Li formed during each cycle cannot exceed 1%, assuming the electrolyte amount is still sufficient after 100 cycles.

There are few reports on employing thin layers of Li metal to evaluate electrode materials, which is, however, a key parameter to consider when switching from coin cells to pouch cells. Although one might suppose a thicker Li metal anode without a copper current collector could be used, it is not feasible to do so considering the need for homogeneous distribution of the electric field provided by Cu foil. Additionally, even when a thicker Li anode is used without a Cu current collector, the electrolyte amount would need to be increased proportionally to improve stable cycling (FIG. 9). More importantly, removal of the current collector may shorten the cell cycle life due to formation of isolated Li cracks caused by uneven Li stripping. Without a current collector to anchor the isolated Li cracks, the cycling of Li metal, especially at a high rate or during high capacity stripping, could be significantly shortened.

Figure 10:
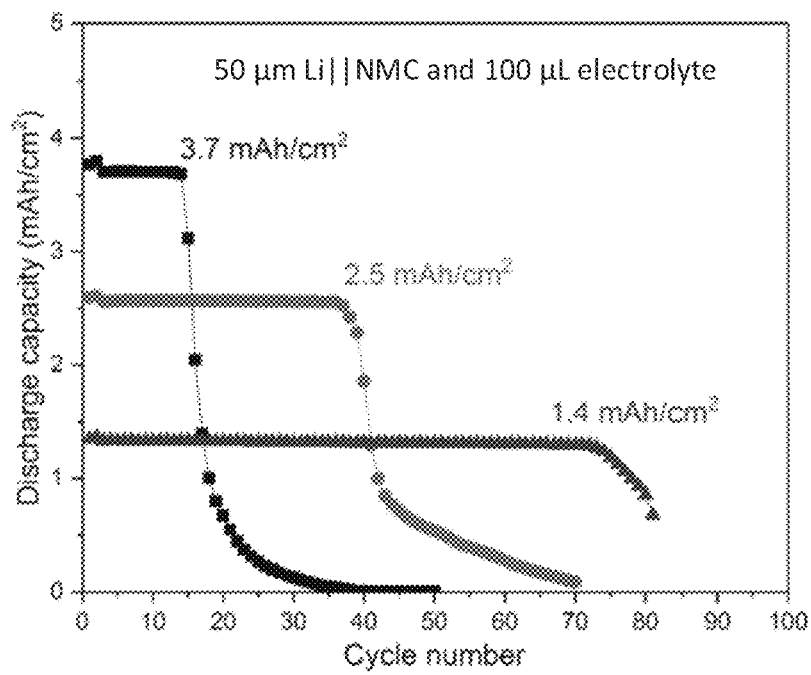
FIG. 10 is a graph showing variation of cycle life in a Li∥NMC622 coin cell as a function of cathode loading.

In an electrochemical cell, the same amount of charge flows through both electrodes during each discharge/charge process. The areal capacity of the cathode—the limiting electrode—determines the amount of Li being deposited/stripped during each cycle. To demonstrate the effect of cathode loading, an excess amount of electrolyte (100 μL) is used in each Li∥NMC622 coin cell in FIG. 10 while fixing the Li anode thickness at 50 μm. When the cathode areal capacity is increased from 1.4 mAh/cm$^2$ to 3.7 mAh/cm$^2$, the amount of Li being deposited/stripped during each cycle and the current density applied vary accordingly. For a 1.4 mAh/cm$^2$ cathode, the corresponding capacity contributed by the Li anode is also 1.4 mAh/cm$^2$, which corresponds to about 7 μm thickness of Li being deposited/stripped each time. For a cathode with 3.7 mAh/cm$^2$ loading, Li metal that participates in the electrochemical reaction will be as thick as 18 μm. As a result, clearly different cycling stabilities of the cells are seen in FIG. 10. The cell with a high NMC622 areal capacity of 3.7 mAh/cm$^2$ quickly degrades after about 15 cycles, while the cycle life is improved to ~37 cycles or ~73 cycles by decreasing areal loadings to ~2.5 mAh/cm² or 1.4 mAh/cm², respectively. It is noted that as the cathode loading increases, the capacity degradation rate is not linear. As more Li participates during each cycle at a higher current density, more SEI and inactive Li are formed per cycle, which aggravates the cell failure much faster than expected.

Figure 11:
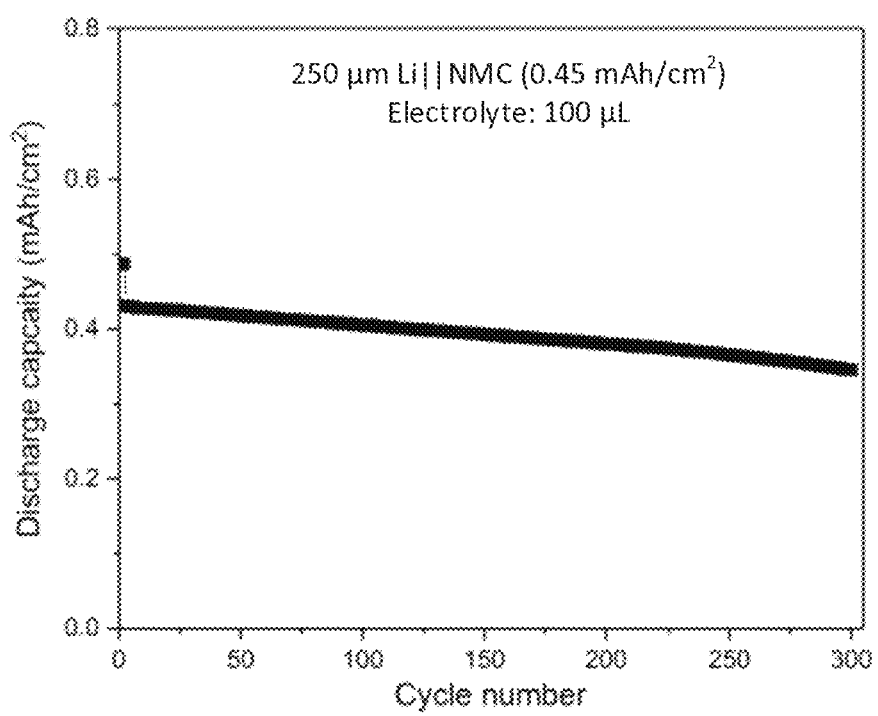
FIG. 11 is a graph showing variation of cycle life in a Li∥NMC622 coin cell under unconstrained conditions: cathode ~0.45 mAh/cm$^2$, and 250 μm Li foil anode with 100 μL of electrolyte at 2 C charge and discharge after initial formation cycle at C/10.

From the above discussion, it is clear cell performances are easily and drastically improved simply by manipulating the testing conditions. FIG. 11 shows that a long cycle life is easily obtained if a thick Li metal layer (250 µm or more), a significant excessive amount of electrolyte (100 µL or more), and a very thin and extremely low mass loading of cathode (e.g., <0.5 mAh/cm²) are combined ~300 cycles with >80% capacity retention even at 2 C—one order of magnitude higher than those observed in FIGS. 8-10.

Example 2

300 Wh/kg Li||NMC622 Pouch Cell

A pouch cell including 8 NMC622 cathodes and 7 Li anodes was prepared. A 12 µm Al current collector was used for the cathode current collectors, and 8 µm copper foil was used for the anode current collectors. The separators were 20 µm Celgard® membranes to minimize the risk of cell shorting with a Li metal anode. FIG. 2 shows the typical internal structure of a multilayered pouch cell (albeit with fewer layers), and FIG. 3 shows the exterior structure with the cathode and anode protruding tabs. Table 2 lists the detailed cell parameters for constructing a 300 Wh/kg Li||NMC622 pouch cell with a minimum total capacity of 1 Ah.

The cathode includes the total weight of the NMC622, binder, and carbon additive coated on each side of an Al current collector as well as the weight of the Al current collector. To minimize the parasitic weight of the cell, the active mass loading of NMC622 is 96%, while the weight of the binder and carbon additive together is 4%. This is very different from coin cell cathodes in which the cathode active material is about 80% of the weight with more carbon used to improve electronic conductivity of the cathode. For automobile applications, the typical cathode areal capacity is around 3-4 mAh/cm², which is duplicated in the pouch cell. The total coating weight of cathode (NMC/binder/carbon) was 20.2 mg/cm² on each side of the Al current collector; the specific capacity of NMC622 is 180 mAh/g. Another important parameter for the cathode is the electrode thickness and porosity. After calendaring the cathode, the thickness of the as-prepared NMC622 cathode was 66 µm on each side of the Al foil, corresponding to an electrode density of 3.0 g/cm³ (=20.2 mg/cm²/66 µm). The thickness and porosity determine not only the cathode loading, but also the amount of the electrolyte which fills in the pore spaces in the cathode. If an electrode is highly porous, it will absorb a significant amount of electrolyte, which greatly sacrifices the cell specific energy since the electrolyte weight is considered as "dead" weight. On the other hand, a very dense electrode is difficult for mass transport due to the increased tortuosity and decreased porosity. The prepared cathodes had a porosity of about 30% (Table 2).

Li metal was used as the anode and coated on both sides of the Cu current collector. The amount of Li is closely related to the cathode areal capacity. The areal capacity ratio between negative and positive electrodes is the N/P ratio. In a typical commercial Li-ion cell where graphite is used as the anode, the N/P ratio is 1.1. If the same N/P ratio was used in this Li metal pouch cell, the anode areal capacity should be 3.5 mAh/cm²×1.1=3.85 mAh/cm². However, the thinnest commercially available Li foil was 50 µm on each side of the Cu current collector. For every 1 mAh/cm², the thickness of fresh Li is about 5 µm so the actual anode areal capacity is 10 mAh/cm², giving a N/P ratio of (10 mAh/cm²)/(3.5 mAh/cm²)=2.86, more than twice that of Li-ion cells. Although an increased amount of Li metal helps ensure sufficient Li in the cell and a longer cycling life due to continuous reaction between Li and electrolyte, a limited N/P ratio (less than 3) and thin Li foil (<50 µm) are desired to reduce the total weight and cost of the pouch cell.

To quantify the electrolyte amount in the pouch cell, the electrolyte/cell capacity ratio (E/C) is used to reflect the amount of electrolyte infiltrated into the cell. Table 2 shows that the E/C ratio is 3 g/Ah, meaning that for every 1 Ah capacity (calculated from the cathode), the added electrolyte is 3 g. The maximum amount of electrolyte allowed in the pouch cell is mainly determined by the cell weight. From Table 2, the total energy, based on the experimentally determined capacity and voltage, is 1.09 Ah×3.83 V=4.17 Wh. To meet a cell specific energy goal of 300 Wh/kg, the maximum weight of the pouch cannot exceed 13.9 g. The dry cell (without electrolyte) had a mass of 10.7 g. Therefore the total amount of electrolyte was controlled to be ~3.2 g, providing an E/C ratio of 3 g/Ah. In commercial Li-ion cells, the electrolyte amount is about 1.3 g/Ah, which is less than half of the electrolyte amount in the present Li metal pouch cell. The greatly reduced weight of Li, compared to graphite allows addition of more electrolyte for longer cell life.

TABLE 2

Cell Parameters of a 300 Wh/kg Li||NMC622 Pouch Cell (Cell dimensions 70 mm × 41.5 mm)

| | Cell Parameters | |
|---|---|---|
| NMC622 Cathode | 1$^{st}$ discharge capacity (mAh/g) | 180 |
| | Active material loading | 96% |
| | Total coating weight (mg/cm² each side) | 20.2 |
| | Areal capacity (mAh/cm² each side) | 3.5 |
| | Electrode press density (g/cm³) | 3.00 |
| | Electrode length (mm) | 54 |
| | Electrode width (mm) | 36 |
| | Electrode thickness (single side) (µm) | 66 |
| | Al foil thickness (µm) | 12 |
| | Layers | 8 |
| Li Anode | Cell balance (N/P) ratio | 2.86 |
| | Electrode thickness (single side) (µm) | 50 |
| | Cu foil thickness (µm) | 8 |
| Electrolyte | Electrolyte/capacity (g/Ah) | 3 |
| | Weight (g) | 3.27 |
| Separator | Thickness (µm) | 20 |
| Packaging Foil | Thickness (µm) | 86 |
| Cell | Voltage (V) | 3.83 |
| | Capacity (Ah) | 1.09 |
| | Specific energy (Wh/kg) | 300 |

Figure 15:
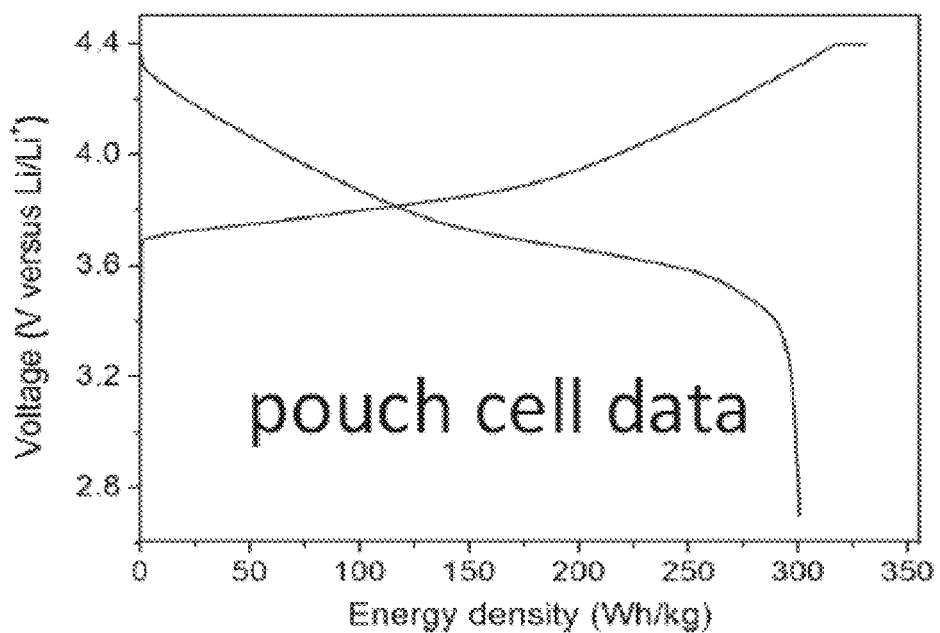
FIG. 15 is a graph showing a first charge/discharge curve at C/10 of a 300 Wh/kg Li∥NMC622 pouch cell as disclosed herein.
Figure 16:
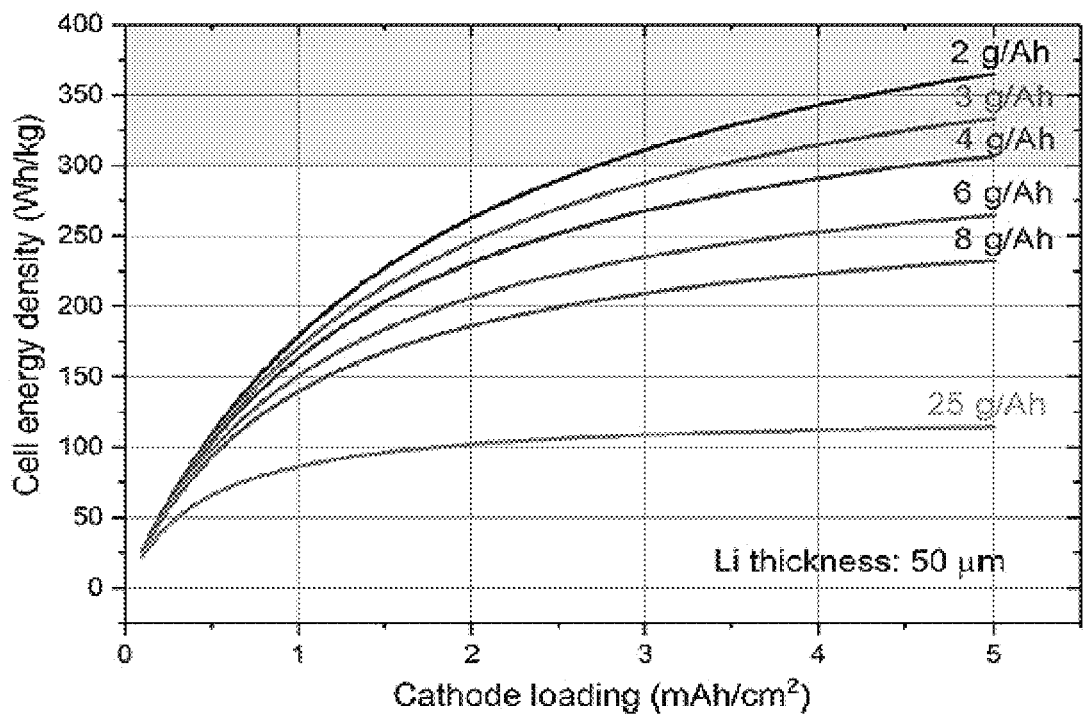
FIG. 16 is a graph showing calculated cell specific energy (Wh/kg) of a 70 mm×41.5 mm Li∥NMC622 pouch cell with a 50 μm Li metal anode and eight layers of cathodes at various cathode loadings and various electrolyte contents.

FIG. 15 shows the first charge-discharge curve at C/10 of the Li||NMC622 pouch cell under a compression force of 70 kPa (10 psi). FIG. 16 is a graph showing calculated cell specific energy (Wh/kg) of a 70 mm×41.5 mm Li||NMC622 pouch cell with a 50 µm Li metal anode and eight layers of cathodes at various cathode loadings and various electrolyte contents. The region of the graph above the 300 Wh/kg goal is shaded. As shown in FIG. 16, when a higher E/C ratio is used (flooded electrolyte conditions), not only is the cell specific energy greatly decreased at the same cathode loading, but the saturation point also comes much earlier than in those with lean electrolytes. For example, in the cell design with 25 g/Ah electrolyte content, the cell specific energy reaches maximum at ~100 Wh/kg with a cathode loading of 3 mAh/cm² on each side of the Al current collector. Regardless of further increased cathode loading, the cell-specific energy remains substantially constant due to the large amount of electrolyte in the cell.

Example 3

300 Wh/kg Li Metal Pouch Cells with Conventional and Localized Superconcentrated Electrolytes A 300 Wh/kg Li||NMC622 ($LiNi_{0.6}Mn_{0.2}Co_{0.2}O_2$) pouch cell (e.g., as shown in FIGS. 2-3) was prepared with the parameters shown in Table 3. Commercial NMC622 material was laminated into the cathodes on Al foil in the pouch cell with a high areal capacity of 3.8 mAh·cm⁻². For the anode, two 50 μm thick Li metal sheets were affixed to both sides of the Cu current collector, giving a negative/positive capacity ratio (i.e., N/P ratio or cell balance) of 2.6. A ratio of electrolyte weight over cell capacity (E/C ratio) is used to quantify the electrolyte amount and was set at 3.0 g (Ah)⁻¹. To pack more than 1.0 Ah capacity and 300 Wh kg⁻¹ energy into the very restricted volume with controlled weight, at least seven layers of cathodes/anodes are needed based on the above cell parameters. Compared to the graphite anode in commercial LIBs, the Li metal anode is very light and weighs only 5.5 wt % of the entire pouch cell configuration as shown in the weight distribution table (Table 4). The cathode and electrolyte remain the two heaviest components. Both the N/P ratio and E/C ratio in LMBs are slightly higher than their corresponding values in present commercial LIBs (Panasonic 18650B, N/P at ~1.1, E/C at ~1.3 g (Ah)⁻¹) (see, e.g., Hagen et al., *Adv. Energy Mater.* 2015, 5:1401986), which are designed to compensate for the loss from their endless parasitic interfacial side reactions between Li and liquid electrolyte.

TABLE 3

Cell parameters of Li||NMC622 pouch cell for 300 Wh kg⁻¹ at 1.0 Ah level

| | Content | Values |
|---|---|---|
| NMC622 cathode | Discharge capacity | 185 mAh g⁻¹ |
| | Active material loading | 96% |
| | Area weight (each side) | 21.4 mg cm⁻² |
| | Areal capacity (each side) | 3.8 mAh cm⁻² |
| | Electrode density | 3.0 g cm⁻³ |
| | Electrode thickness (each side) | 70 μm |
| | Number of layers | 7 |
| Al foil | Thickness | 12 μm |
| Li anode | Specific capacity | 3860 mAh g⁻¹ |
| | Li thickness (each side) | 50 μm |
| | Areal capacity (each side) | 9.8 mAh cm⁻² |
| | N/P ratio | 2.6 |
| Cu foil | Thickness | 8 μm |
| Electrolyte | E/C ratio | 3.0 g (Ah)⁻¹ |
| Separator | Thickness | 20 μm |
| Package foil | Thickness | 115 μm |
| Cell | Average voltage | 3.7 V |
| | Capacity | ≥1.0 Ah |
| | Cell Energy | ≥300 Wh kg⁻¹ |

TABLE 4

Weight Distribution

| Component | Weight % |
|---|---|
| Cathode material | 46.6 |
| Electrolyte | 24.1 |
| Packaging | 7.9 |
| Cu foil | 7.8 |
| Li metal | 5.5 |
| Al foil | 3.8 |
| Separator | 3.1 |
| Tabs | 1.3 |

The pouch cell in this example was composed of a high areal capacity cathode (70 μm thick, 3.8 mAh cm⁻²) and a thin Li anode (50 μm thick, 9.8 mAh cm⁻²), giving the N/P ratio of only 2.6. The electrolyte was very lean at only 3.0 g (Ah)⁻¹. Unless otherwise specified, all cells were subjected to two formation cycles at C/10 rate prior to cycling at 25° C. (1C=3.8 mA·cm⁻²).

In contrast, for a typical coin cell from the literature, the cathode areal capacity is usually around 1.0 mAh cm⁻² or lower. The Li metal anode in a coin cell has a thickness of 250 μm or thicker, leading to an N/P ratio of 50 or even higher. Furthermore, the amount of electrolyte added to a coin cell is rarely provided in the literature, and very often the coin cells are flooded (75 μL electrolyte will fully fill the 2032 coin cell space, assuming the cathode area is 1.2 cm², the electrolyte density is 1.2 g cm⁻³), resulting in the E/C ratio of 75 g (Ah)⁻¹, which is more than 25 times higher than that in the 300 Wh kg⁻¹ pouch cell. Therefore, the coin-type Li metal cells with these almost unlimited Li and excessive electrolyte easily demonstrate hundreds or even thousands of stable cycles at the shallow cycling (low cathode loading). However, these parameters used in coin cell tests will dramatically reduce the cell-level energy to less than 50 Wh kg⁻¹, which is not suitable for practical batteries.

Figure 17:
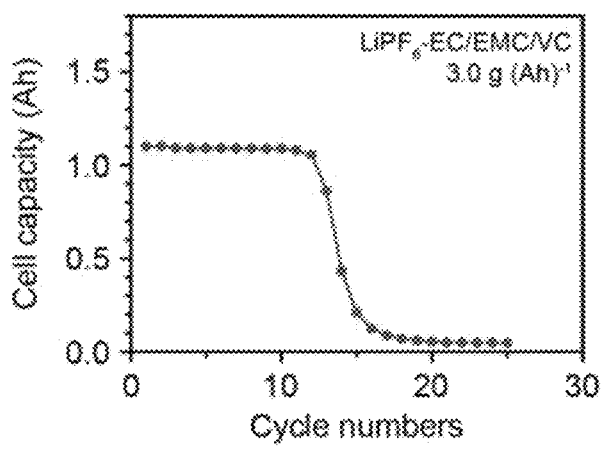
FIG. 17 is a graph showing cycling performance of a 300 Wh·kg$^{-1}$ Li∥NMC622 pouch cell including an electrolyte comprising 1.0 M LiPF$_6$ in EC/EMC (3:7 by wt.)+2 wt % VC, and having an E/C ratio of 3.0 g/Ah.

In realistic pouch cells with a high loading cathode, limited Li and lean electrolyte, the higher areal capacity practically involves a higher areal current density and the reaction of a larger fraction of Li in each cycle, which usually produces rapid Li degradation/depletion, fast SEI buildup, accelerates electrolyte consumption and premature cell failure. The baseline Li||NMC622 pouch cell filled with conventional carbonate electrolyte, 1.0 M $LiPF_6$ in EC/EMC (3:7 by wt.)+2 wt % VC, delivers a total capacity of 1.12 Ah and a cell-level energy of 305 Wh kg⁻¹ discharged at C/3 rate after two formation cycles and charged at C/10 rate (FIG. 17). The specific energy is the real value delivered from the entire pouch cell including all of the active an inactive components' weight as shown in Table 4. Although the reversible cell capacity during the first ten cycles does not change much (FIG. 17), the polarization continues to increase (FIG. 18), the cell swells obviously by more than 110%, and the cell capacity quickly drops to almost zero after only 12 stable cycles.

Figure 19:
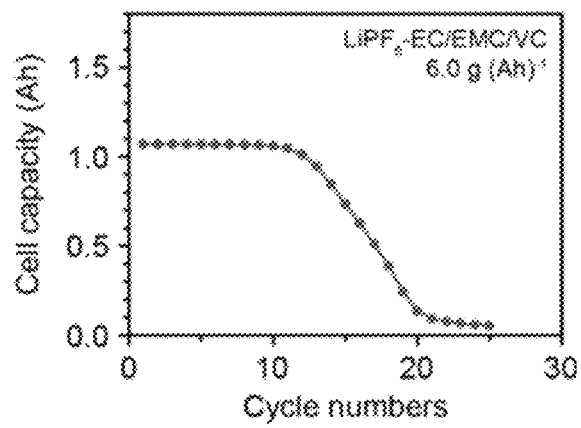
FIG. 19 is a graph showing cycling performance of a Li∥NMC622 pouch cell including an electrolyte comprising 1.0 M LiPF$_6$ in EC/EMC (3:7 by wt.)+2 wt % VC, and having an E/C ratio of 6.0 g/Ah.
Figure 20:
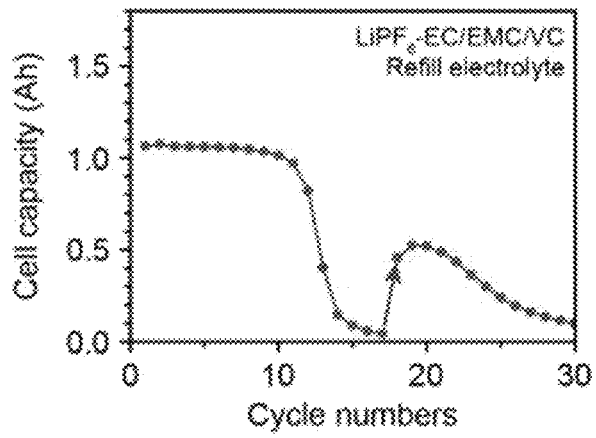
FIG. 20 is a graph showing cycling performance of the cell of FIG. 17 refilled with fresh 1.0 M LiPF$_6$ in EC/EMC (3:7 by wt.)+2 wt % VC, and having an E/C ratio of 3.0 g/Ah.

To understand the limiting factor for the cycle life, a fresh pouch cell is assembled with twice the amount of electrolyte, i.e., 6.0 g (Ah)⁻¹, while keeping all the other cell parameters the same (FIG. 19). Still, the cycling was limited, and the capacity dropped off after the same 12 cycles. These results appear to indicate that the electrolyte amount is not the major limiting factor for cell failure. To further verify the effect of the electrolyte, one of the failed pouch cells was refilled with a sufficient amount of fresh electrolyte (3.0 g/Ah), but only part of the capacity was recovered, followed by a similar fast fading trend after a few cycles (FIG. 20).

These observations strongly suggest that Li anode depletion, not just electrolyte insufficiency, is the main reason for the limited cycling of pouch cell that leads to the sudden cell termination.

Figure 21:
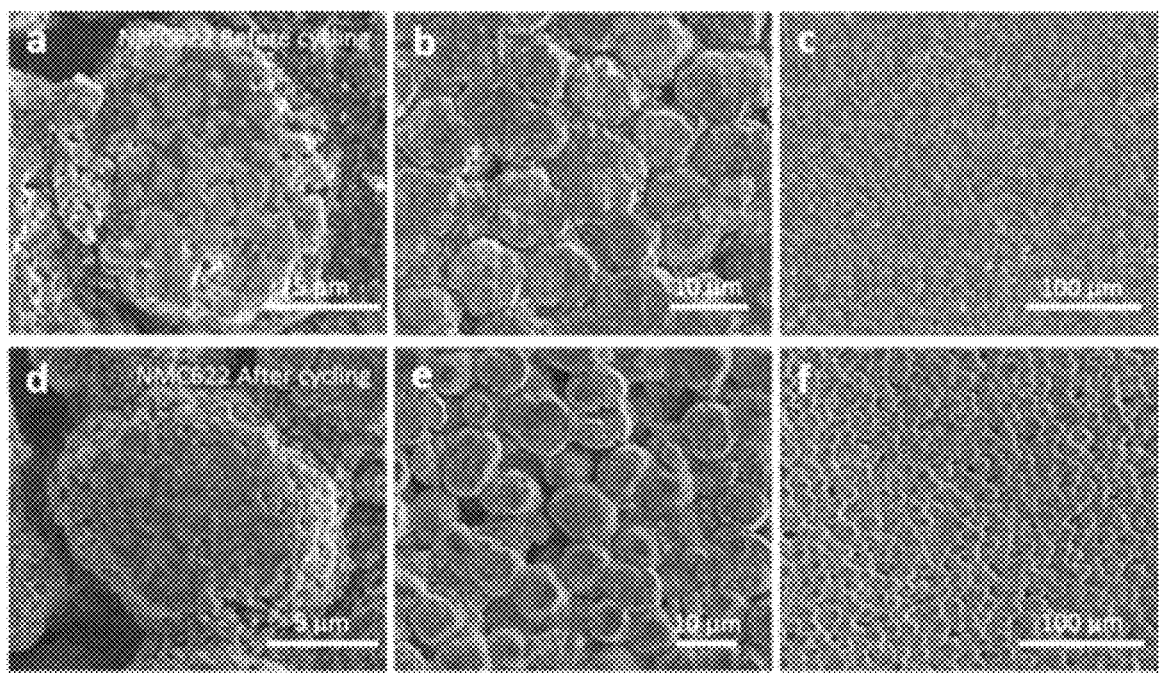
FIG. 21 is a series of scanning electron microscopy (SEM) images of the NMC622 cathode before (upper panels) and after (lower panels) cycling in the 300 Wh/kg pouch cell of FIG. 17.

In order to exclude the cathode as the limiting factor, the cycled cathodes were reassembled into coin cells with fresh Li metal and electrolyte. All of these recycled cathodes had well-maintained structures and morphologies and displayed highly reversible capacity with stable cycling. FIG. 21 shows SEM images of the NMC622 cathode before (upper panels) and after (lower panels) 12 cycles in the 300 Wh/kg pouch cell of FIG. 17. FIG. 22 shows stable cycling when the cycled cathode was reassembled into a coin cell, which was charged at 1 mA·cm$^{-2}$ and discharged at 2 mA·cm$^{-2}$ after an initial two formation cycles with charge/discharge at 0.2 mA·cm$^{-2}$.

Figure 18:
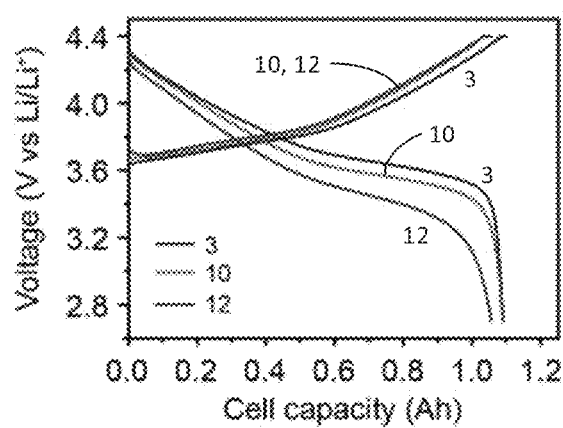
FIG. 18 is graph showing the voltage curves for the cell of FIG. 17.

In addition, although ill-defined Li dendrites can short the cell, while at a low charge rate of C/10 in this work, none of the failed cells were caused by shorting as indicated by their voltage profiles at the end of cycling (FIG. 18). Taken together, the results confirm that the major reason for the fast degradation of the realistic pouch cell was related to degradation of the Li metal anode. FIGS. 23A-23D are SEM images of the lithium anode. FIGS. 23A and 23B, respectively, are a top view and cross-sectional SEM image of the Li anode after cycling. FIGS. 23C and 23D are, respectively, cross-sectional and top view SEM images of the cycled Li anode at the edge, showing the difference of cycled Li and fresh Li. The thickness changes are shown in Table 5.

TABLE 5

| | 1.0M LiPF$_6$/(EC:EMC:VC) electrolyte | | |
|---|---|---|---|
| | Before cycling | After 12 cycles | Swelling |
| Cell thickness | 2.7 mm | 5.7 mm | 3.0 mm |
| One cathode layer | 156 μm | 158 μm | 2 μm |
| Separator | 20 μm | 22 μm | 2 μm |
| One anode layer | 108 μm | ~525 μm | ~2.9 mm for 7 layers |

Figure 24:
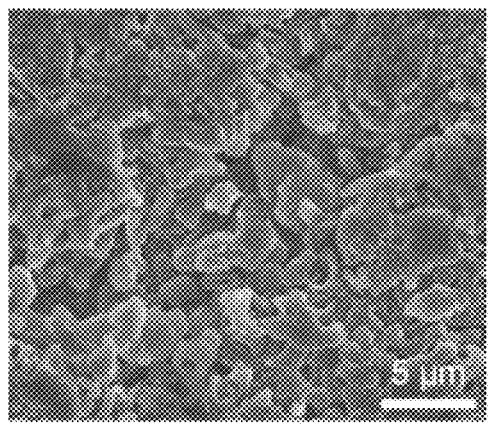
FIG. 24 is a top view SEM image of the Li anode of the cell of FIG. 17, showing small Li particles after cell fading.

Fundamentally, the conventional carbonate electrolyte is not compatible with Li metal. After 12 cycles, Li anodes on both sides of the Cu foil expand significantly to different degrees (160 μm and 250 μm), suggesting the very non-uniform reactions between Li and carbonate electrolyte (FIG. 23B). A large amount of electrolyte and Li irreversibly react with each other, and both are being consumed during each cycle. The continuous formation and accumulation of thick SEI generate "dead" Li particles which are completely wrapped/insulated by the SEI and lose electronic contact from the rest of anode. Such "dead" Li will not participate in the subsequent electrochemical reactions, leaving behind a very fine anode microstructure, a loose and powdered structure (FIG. 24).

Figure 25:
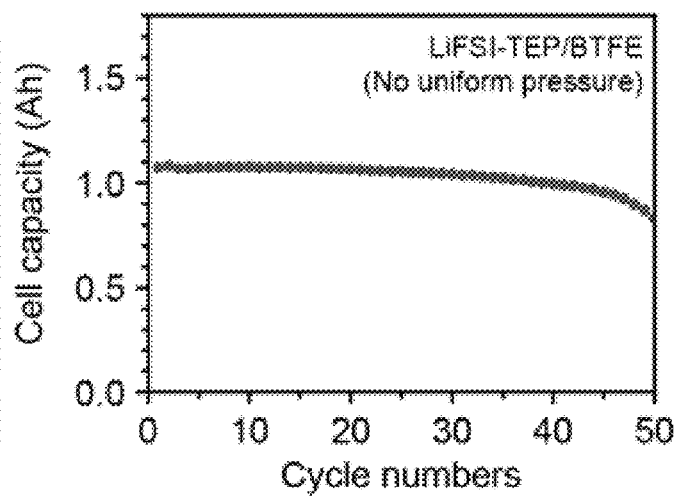
FIG. 25 shows the cycling performance of a 300 Wh·kg$^{-1}$ Li∥NMC622 pouch cell including an electrolyte comprising 1.2 M LiFSI in TEP/BTFE (1:2 by molar ratio) at C/10 charging and C/3 discharging.
Figure 26:
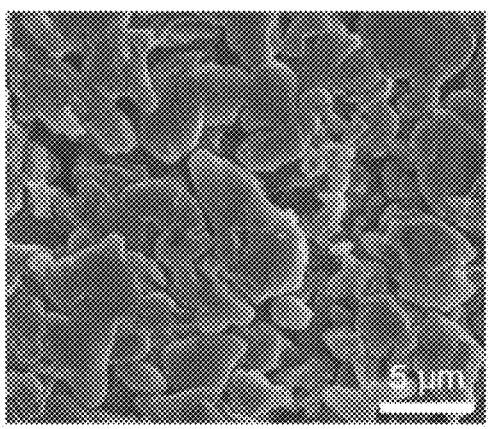
FIG. 26 is a top view SEM image of the Li anode of the cell of FIG. 25 after cycling, exhibiting dense Li deposition composed of relatively larger Li particles.

To slow down the depletion rate of the very limited amounts of Li and lean electrolyte, 1.2 M LiFSI in TEP/BTFE (1:2 by molar ratio) was used to replace the conventional carbonate electrolyte. This electrolyte is non-flammable and highly compatible with Li metal by producing a thinner and denser SEI, which significantly mitigates the aggressive and continuous reactions between Li and electrolyte. After incorporating this electrolyte, 50 cycles of a 300 Wh kg$^{-1}$ pouch cell were obtained (C/10 charging, C/3 discharging, no external pressure) with a 78% capacity retention (FIG. 25). The pouch cell swelling rate was reduced from 111% (the cell in carbonate electrolyte after 12 cycles) to 74%, in which the cell thickness increased from original 2.7 mm to 4.7 mm after 50 cycles. Due to the substantially mitigated side reactions in the compatible electrolyte, less electrolyte and Li are irreversibly wasted during each cycle compared to the case in carbonate electrolyte. Li particles formed in the compatible electrolyte after 50 cycles are more densely deposited and are much larger (FIG. 26) than those formed after 12 cycles in the carbonate electrolyte (FIG. 24). The larger Li particles have less surface area available for side reactions, so the cell swelling was relatively mitigated. Thus, extended stable cycling was observed. Although the cell quickly faded after 50 cycles, there was still intact Li left (FIG. 27), indicating that electrolyte depletion and cell swelling were probably the more dominant reasons for this cell's ultimate failure. Because both Li and electrolyte are very limited in high-energy pouch cells, the significant cell swelling leads to poor electrolyte wetting on the newly exposed Li surfaces during cycling. Therefore, maintaining a good wetting on the newly exposed Li surfaces becomes extremely important to ensure the electrochemical reactions continue to happen.

Figure 28A:
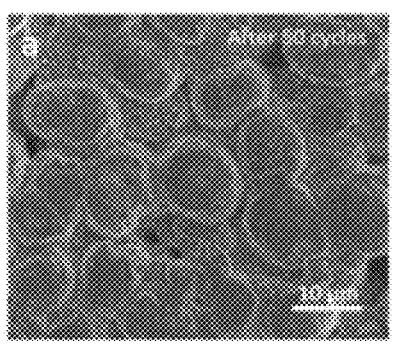
FIGS. 28A-28C are top view (28A, 28B) and cross-sectional (28C) images of the cathode from the cell of FIG. 25 after 50 cycles.
Figure 28B:
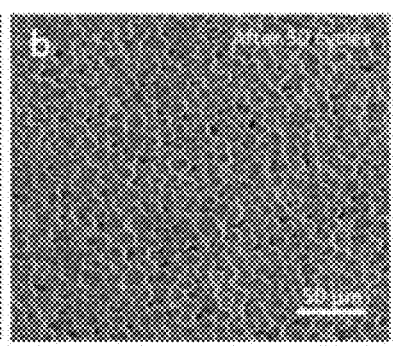
Figure 28C:
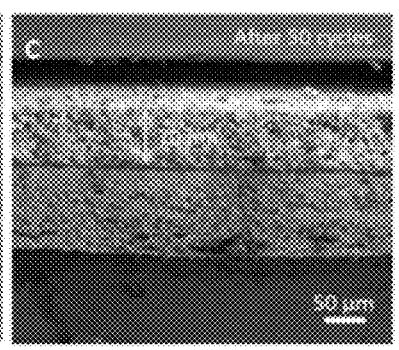
Figures 29A, 29B:
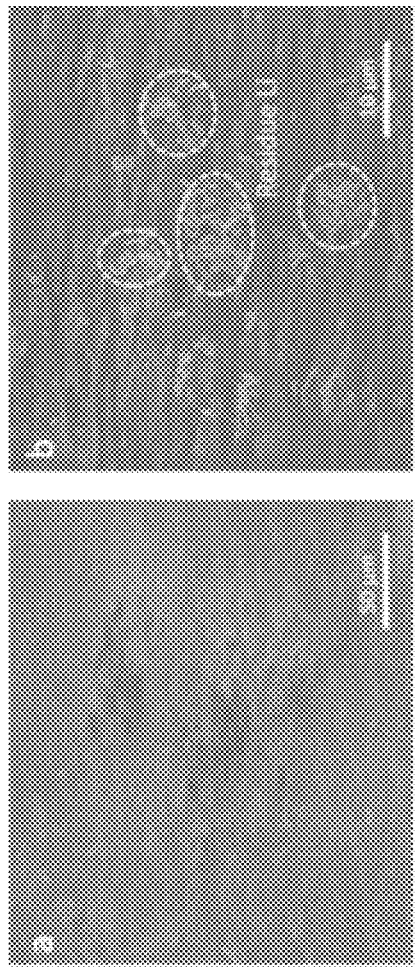
FIGS. 29A-29B are SEM images of the cycled separator from the cell of FIG. 25 after 50 cycles.

Moreover, there was no cracking in the cathode cycled in the compatible electrolyte, maintaining complete micro-structures as the pristine materials (FIGS. 28A-28C). The separator harvested from the pouch cell after 50 cycles did not show any shorted spot, i.e., dark area, consistent with the voltage profiles of the cell at the end of cycling. However, SEM imaging revealed that Li/SEI clusters accumulated on the surface of cycled separator (FIGS. 29A-29B). Although the cell was not terminated by short-circuiting in this study, the accumulation of those clusters with further cycling may raise a safety concern. Therefore, an appropriate treatment on the separator is suggested for further improvements.

Example 4

300 Wh/kg Li Metal Pouch Cell with External Pressure

To further reduce the cell swelling, the effect of a small but uniform external pressure was evaluated. The application of the external pressure appeared to be a reasonable approach considering that these cells are normally under pressure in vehicle applications.

Figure 30:
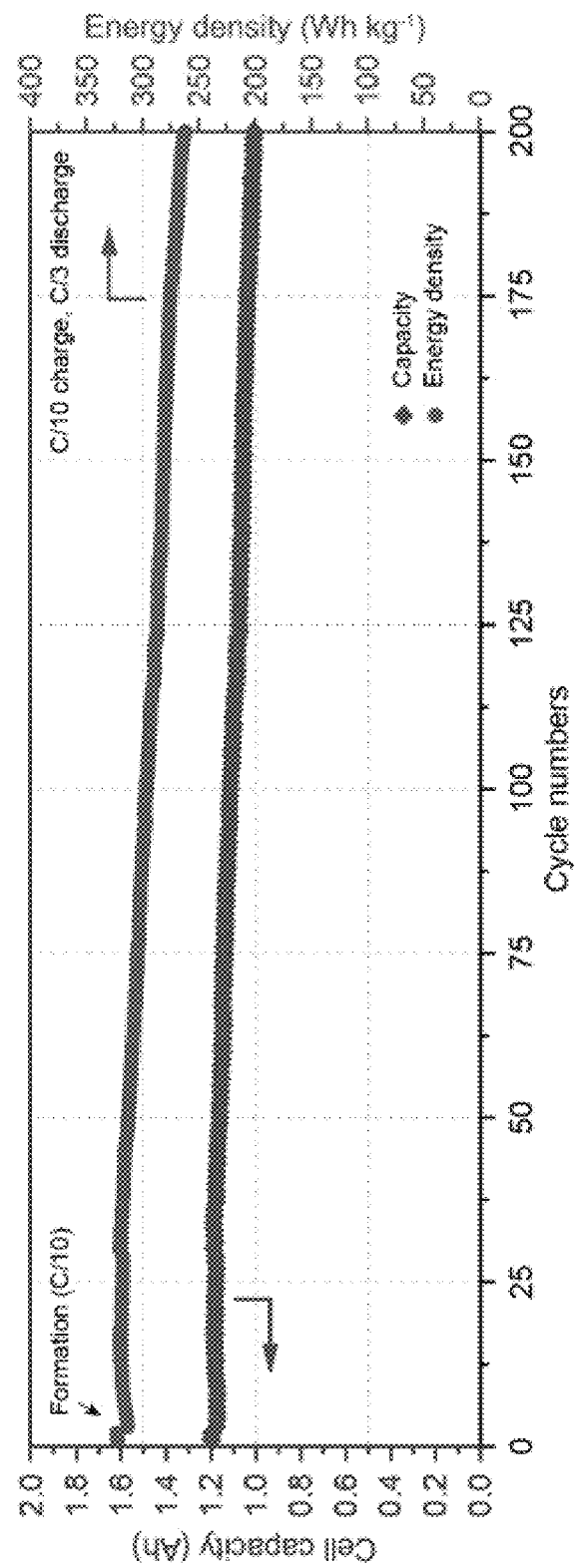
FIG. 30 shows the cycling performance of a 300 Wh·kg$^{-1}$ Li∥NMC622 pouch cell including an electrolyte comprising 1.2 M LiFSI in TEP/BTFE (1:2 molar ratio) under a uniform external pressure of 70 kPa.
Figure 31:
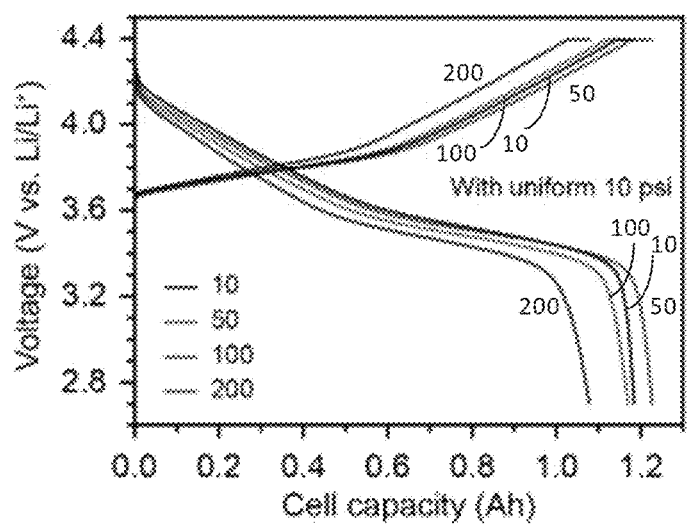
FIG. 31 shows the corresponding charge/discharge curves at the 3$^{rd}$, 50$^{th}$, 100$^{th}$, and 200$^{th}$ cycles of the cell of FIG. 30.
Figure 32:
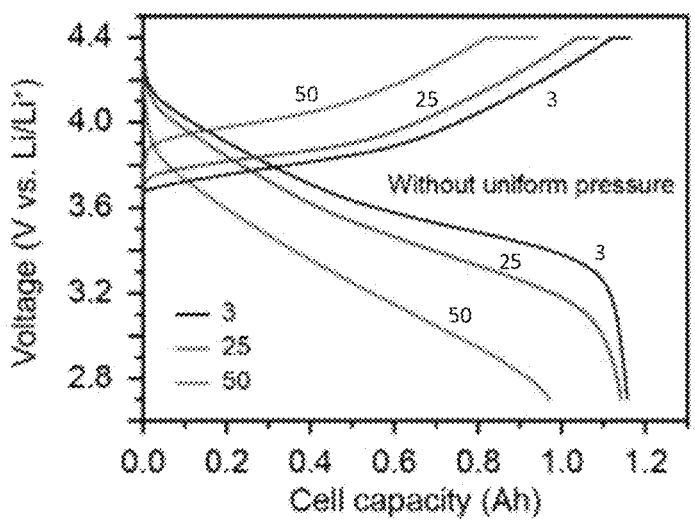
FIG. 32 shows charge/discharge curves of the cell of FIG. 25 without uniform external pressure.
Figure 33A:
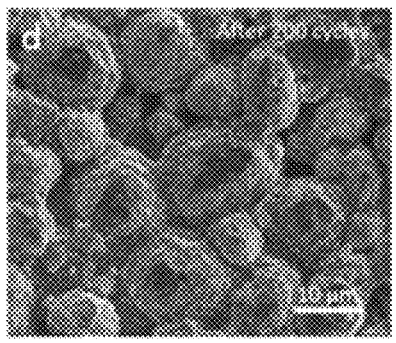
FIGS. 33A-33C are top view (33A, 33B) and cross-sectional (33C) images of the cathode from the cell of FIG. 20 after 200 cycles.
Figure 33B:
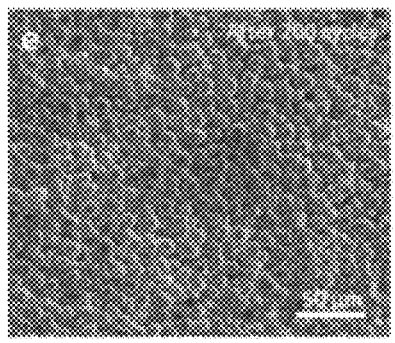
Figure 33C:
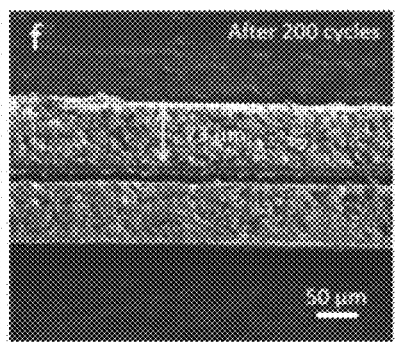

It was determined that simply by applying a uniform pressure of up to 10 psi (70 kPa) on the pouch cell with compatible electrolyte (1.2 M LiFSI in TEP/BTFE) during cycling, the Li∥NMC622 pouch cell delivered a total capacity of 1.17 Ah, a high cell-level energy of 313 Wh kg$^{-1}$ at the C/3 discharge rate. A long-term stable cycling of over 200 cycles with 86% capacity retention was achieved (FIG. 30); the cell was cycled at C/10 for initial formation cycles and then charged at C/10 and discharged at C/3 at 25° C. (1θ=3.8 mA·cm$^{-2}$). Pressure was applied by sandwiching the Li metal pouch cell between two fire-retardant silicon foams with a compression force deflection of 10 psi (70 kPa). The clamping device was custom made with polyether ether ketone (PEEK) material. The cell polarization was also significantly reduced under the uniform pressure (FIG. 31), compared with the cell without uniform pressure (FIG. 32), which demonstrated only 50 cycles as shown in FIG. 25. With application of uniform external pressure, the cell maintained 83% of its initial specific energy at the 200th cycle. The NMC622 cathode, after 200 cycles, still retained good microstructure without obvious electrode volume expanding (FIGS. 33A-33C).

Figure 34:
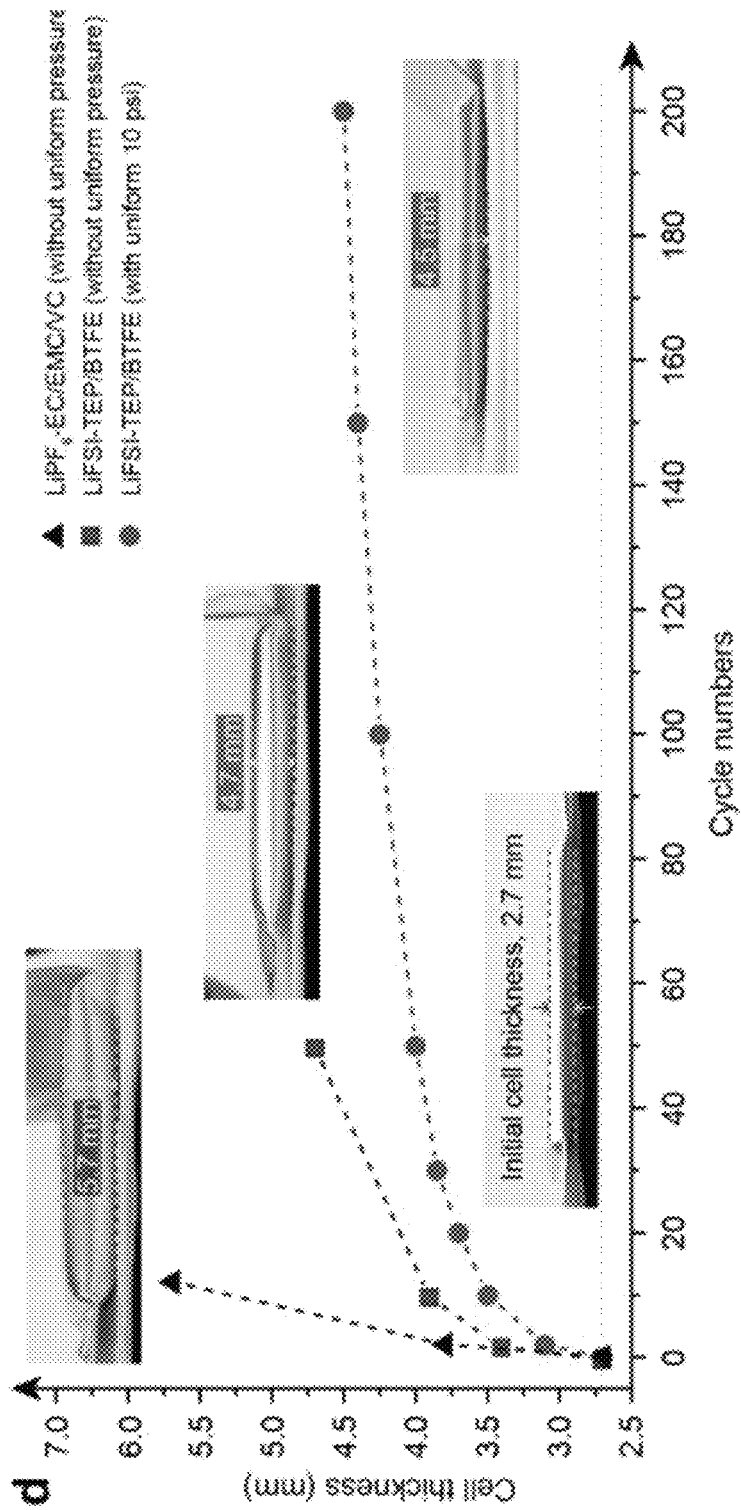
FIG. 34 is a graph comparing cell swelling of three Li∥NMC622 pouch cells under different conditions with the same initial thickness (2.7 mm)—▲LiPF$_6$-EC/EMC/VC electrolyte without pressure, ■LiFSI-TEP/BTFE electrolyte without pressure, •LiFSI-TEP/BTFE electrolyte with uniform external pressure.

Although cell swelling still occurred, the degree of swelling was effectively controlled during the long-term cycling of this cell in comparison to the other two cells—LiPF$_6$-EC/EMC/VC (without pressure) and LiFSI-TEP/BTFE (without pressure) (FIG. 34). All cells had an initial thickness of 2.7 mm. For the pouch cell containing LiFSI-TEP/BTFE and tested under 10 psi (70 kPa) uniform pressure, after two formation cycles the cell swelled from 2.7 mm to 3.1 mm. After ten cycles, the cell swelled to 3.5 mm thick, a much slower swelling rate than the cell containing carbonate electrolyte (swelling 110%, 2.7 mm to 4.7 mm, as discussed before). The thickness was 3.7 mm after 20 cycles, 3.85 mm after 30 cycles, 3.95 mm after 40 cycles, and 4.0 mm after 50 cycles. The total cell expansion during the first 50 cycles was reduced to 48% under 10 psi (70 kPa) pressure, as compared to 74% cell swelling (2.7 mm to 4.7 mm) with the same electrolyte but without uniform pressure at the same 50th cycle. Interestingly, as the cycling continued, the cell swelling significantly decelerated. The pouch cell expanded slowly from 4.0 mm to 4.5 mm in the subsequent 150 cycles, resulting in a much slower swelling rate of only 19% in this long-term cycling (FIG. 34). Although the pouch cell under the external pressure still experienced a total volume expansion of 67% (from 2.7 mm to 4.5 mm) over the entire 200 cycles, the cell swelling was more uniform and much reduced compared to the cell without uniform pressure applied.

Figure 35:
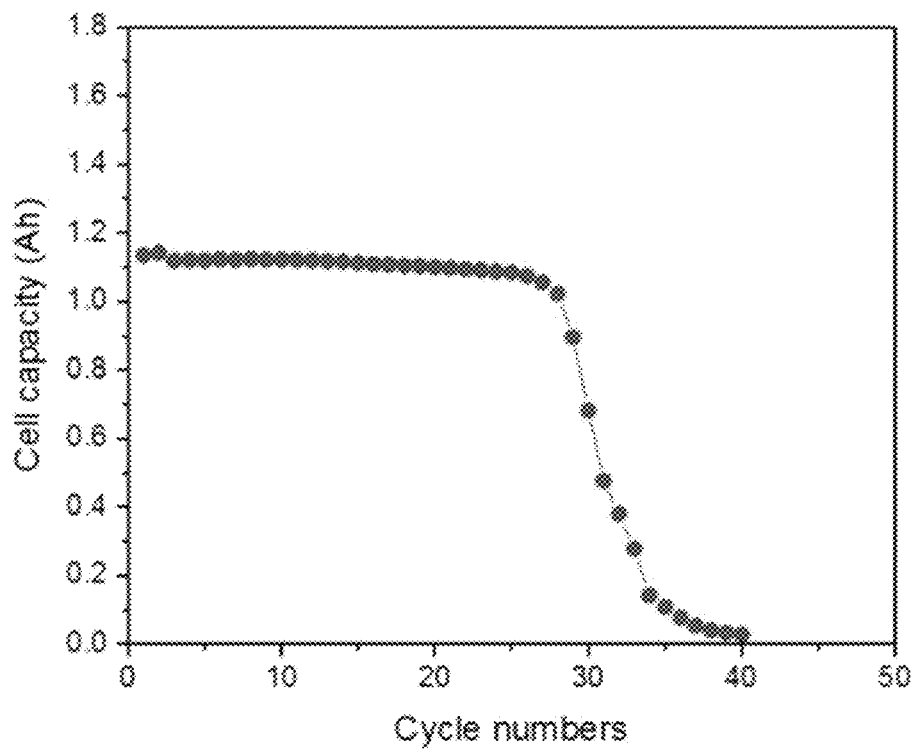
FIG. 35 shows the cycling performance of a 300 Wh·kg$^{-1}$ Li∥NMC622 pouch cell including an electrolyte comprising LiPF$_6$-EC/EMCNC electrolyte with uniform external pressure of 70 kPa.

For superior results, external pressure and a compatible electrolyte are combined. When the conventional carbonate electrolyte (1.0 M LiPF$_6$ in EC/EMC (3:7 by wt)+2 wt % VC) was used, the application of external pressure progressively improved the pouch cell cycling from 12 to 30 cycles (FIG. 35). A quick fading was still observed after about 30 cycles indicating that the interfacial side reaction between electrolyte and Li is still the key fundamental reason for the limited cycling. Cycling was performed at C/10 charging and C/3 discharging. The application of pressure improved the pouch cell cycling from 12 to about 30 cycles.

Figure 27:
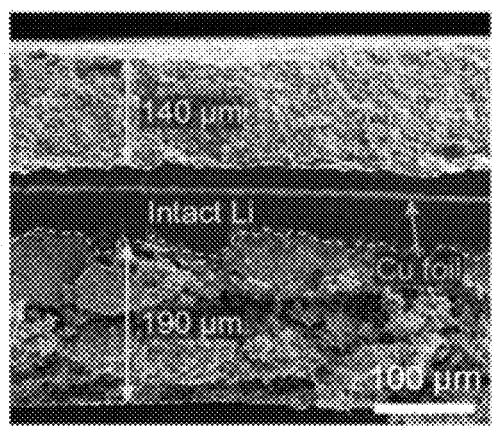
FIG. 27 is a cross-sectional SEM image of the Li anode of the cell of FIG. 25 after cycling.
Figure 36:
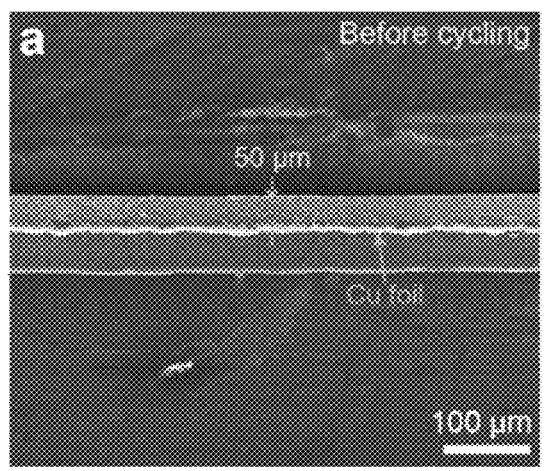
FIG. 36 is a cross-sectional SEM image of a fresh Li metal anode consisting of 50 μm thick Li foil on both sides of Cu foil (8 μm thick).
Figure 38:
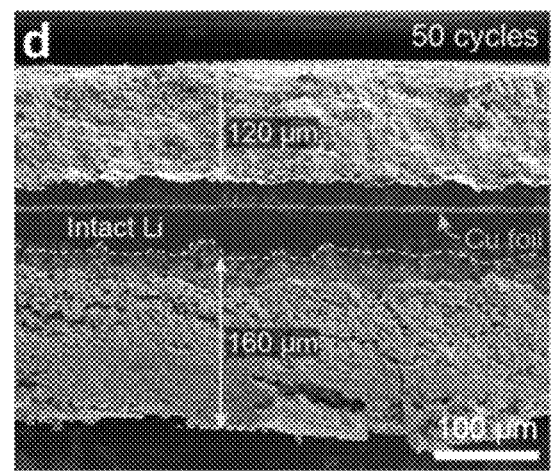
FIG. 38 is a cross-sectional SEM image of the Li metal anode of FIG. 36 after 50 cycles.
Figure 37:
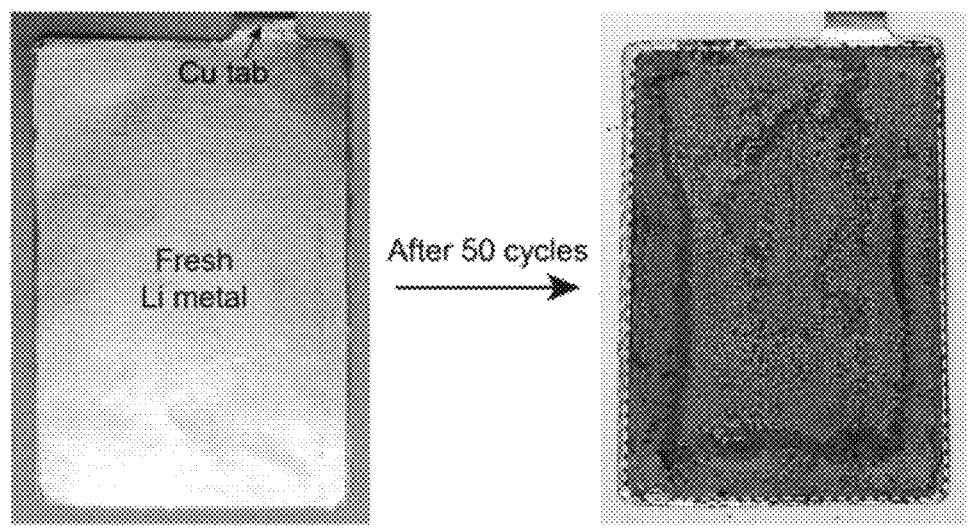
FIG. 37 shows photographs of the fresh Li foil before and after 50 cycles.
Figure 39:
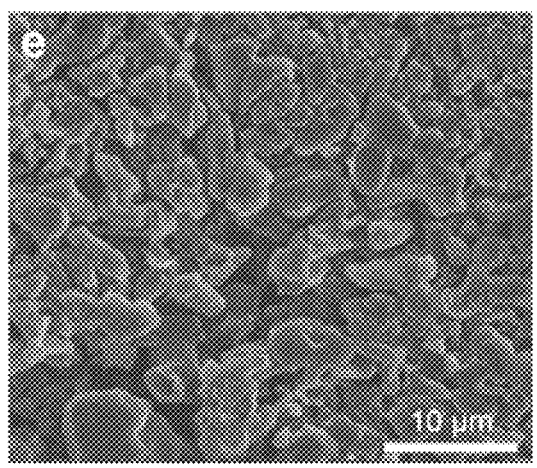
FIG. 39 is a top view SEM image of the Li metal anode of FIG. 36 after 50 cycles.
Figure 40:
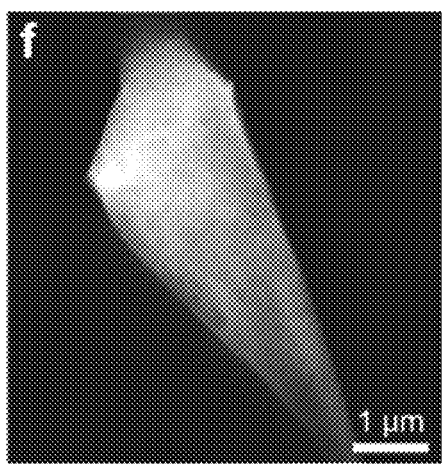
FIG. 40 is a scanning transmission electron microscope (STEM) image of an individual Li particle (covered by SEI) formed after 50 cycles.

To track the morphological and structural changes of the Li metal anode inside the 300 Wh kg$^{-1}$ Li||NMC622 pouch cell during long cycles, the surface and cross-section of the anode were imaged using SEM and STEM. A cross-sectional image of the 50 μm-thick Li foils on both sides of the 8 μm Cu foil before cycling is shown in FIG. 36, which is shiny and appears to be completely adherent to the Cu foil (FIG. 37, left). After 50 cycles, the Li anode surface becomes dark and rough indicating the breakdown of Li (FIG. 37, right). While most of the Li participated in the electrochemical reactions and side reactions with the electrolyte, there was still intact Li left on both sides of the Cu foil under uniform pressure on the 50th cycle (FIG. 38), similar to what was observed on the Li anode from the cell tested without external pressure (FIG. 27). The intact Li provides a Li source for continued cycling. The reacted intermediate Li particles also show similar size (FIGS. 39, 40), i.e., a few microns, as those in the cell without uniform pressure (FIG. 26) in the same electrolyte. Although pulverized, Li after 50 cycles in the compatible electrolyte displays large particles (FIG. 39) suggesting reduced surface areas for side reactions to occur. However, under 10 psi (70 kPa) pressure, Li swelling was much less than the anode tested without uniform pressure after the same 50 cycles, suggesting a more compact and intimate contact among Li, electrolyte, and SEI within the anode. So the cell continued to cycling to more than 200 cycles, while without the uniform pressure the cell failed quickly after 50 cycles. Because of the significant volume expansion in the absence of external pressure, the rest of the lean electrolyte can hardly wet the incompact Li particles to continue the electrochemical reactions.

Figure 41:
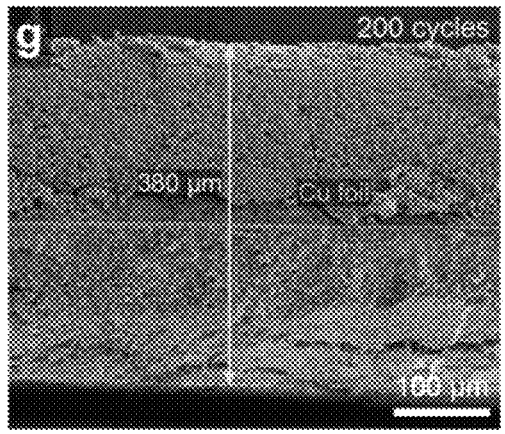
FIG. 41 is a cross-sectional SEM image of the Li metal anode of FIG. 36 after 200 cycles.
Figure 42:
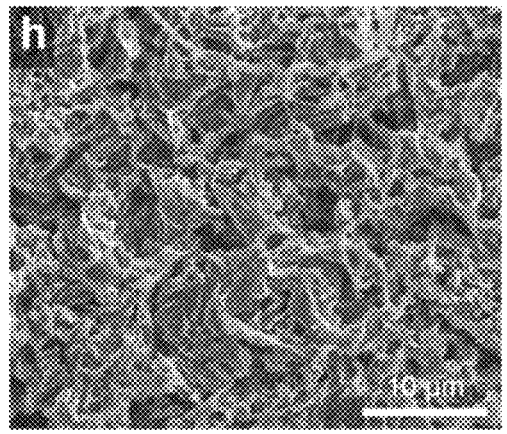
FIG. 42 is a top view SEM image of the Li metal anode of FIG. 36 after 200 cycles.
Figure 43A:
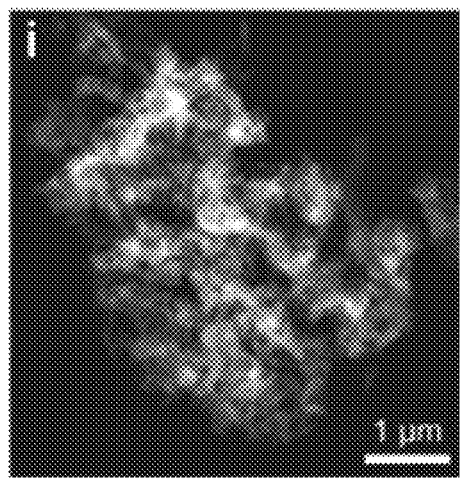
FIGS. 43A and 43B are STEM images of the highly porous sponge-like Li entangled with the SEI layer which forms after 200 cycles.
Figure 43B:
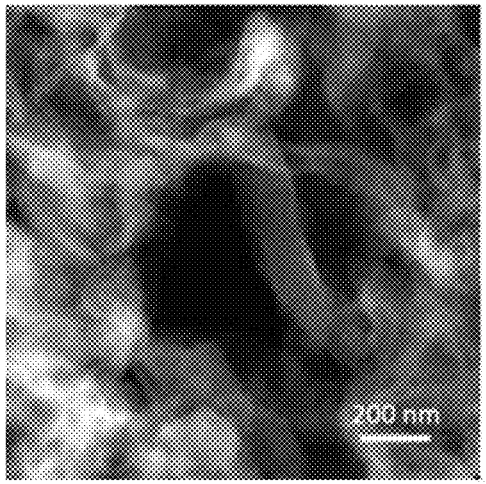

As the cell continued to operate beyond 50 cycles under 10 psi (70 kPa), almost all of the Li participated in the electrochemical reactions (FIG. 41), extending the stable cycling to as long as 200 cycles. The whole Li anode after extensive cycling becomes more porous (FIG. 42). No residual dense Li was found after extensive cycling even though a compatible electrolyte was used. The intermediate individual solid Li particles observed at the 50th cycle evolve into porous particles (FIGS. 43A-43B). The porous Li particles mixed with SEI components after 200 cycles maintained a similar size as the precursor formed by the 50th cycle. Even though the internal structure of the particles became much looser due to the intensive side reactions during long cycles, the overall morphologies of the oval shaped particles were maintained, which is consistent with the reduced cell swelling during the long cycling. The cell contained 7 layers of anodes. Due to uneven electrolyte wetting and the localized current densities, each Li anode was not exactly the same after cycling. However, the general trend was similar, i.e., intact Li and large Li particles found after 50 cycles, and all Li became porous after 200 cycles.

The cell thickness change (Δt, minus the initial cell thickness) can be roughly described as equation (1) within 200 cycles based on FIG. 34:

$$\Delta t = N^a \quad (1)$$

where a is an adjustable value. Then the degree of cell swelling can be plotted as equation (2) by logarithm on both sides, $$\log_{10}\Delta t = a \log_{10} N \quad (2)$$

Figure 44:
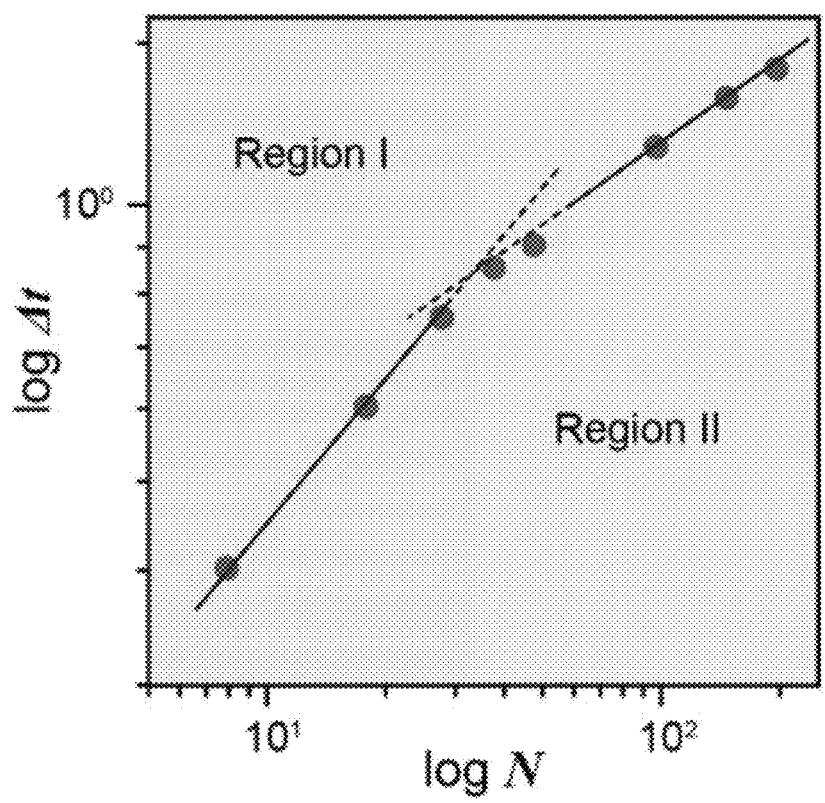
FIG. 44 is graph plotting the degree of cell swelling as a function of the cycle number on; the logarithm of cell thickness changes (Δt) is plotted as function of the logarithm of the cycle number (N).
Figure 45:
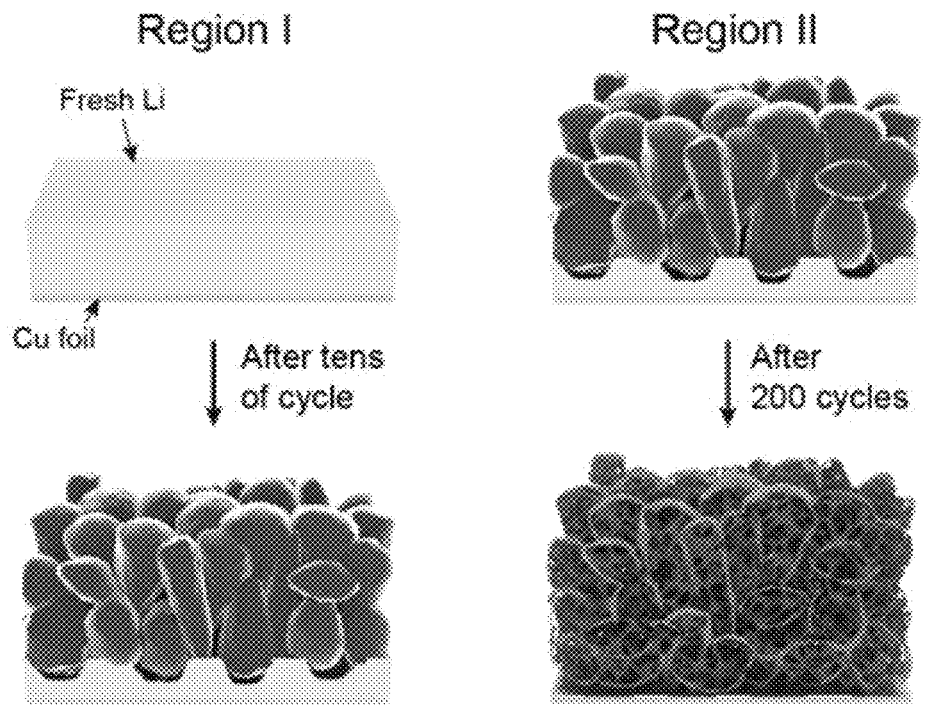
FIG. 45 is a schematic diagram showing Li metal anode structural evolution under two different regions: Region I—initial 50 cycles, Region II—subsequent long cycling.
Figure 46:
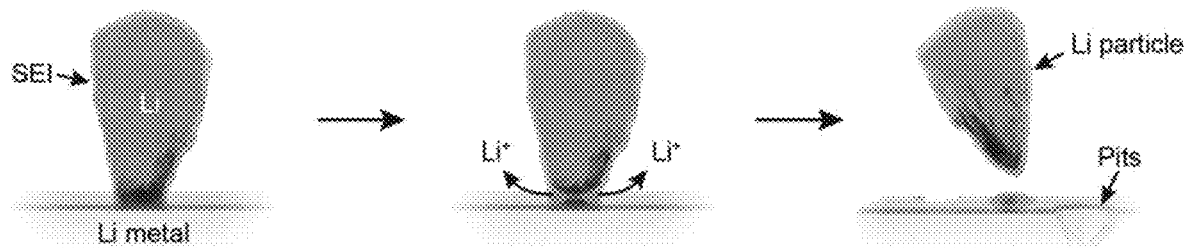
FIG. 46 is a schematic diagram showing conversion of flat Li foil to large Li particles entangled by SEI constituents during the first 50 cycles.
Figure 47:
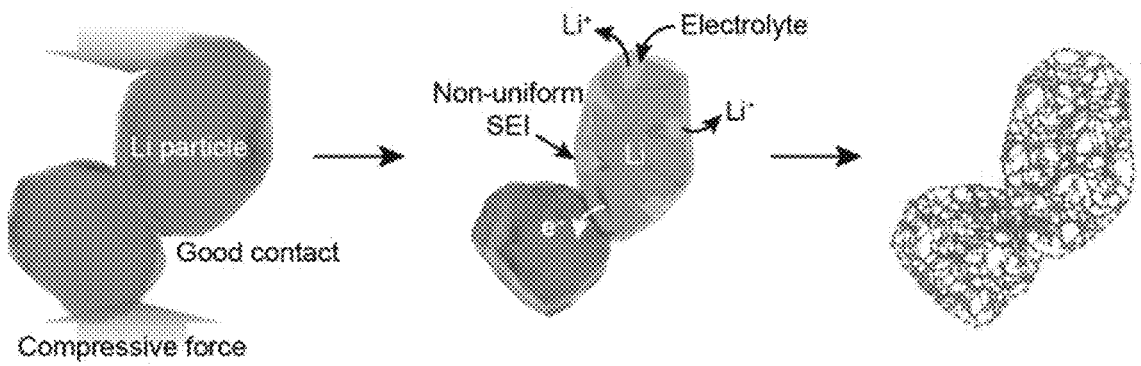
FIG. 47 is a schematic diagram showing continuing electrochemical reactions inside the Li particles, resulting in evolution of solid Li particles to a highly porous structure during subsequent long cycling.

Interestingly, two distinct regions are observed (FIG. 44). The logarithms of the cell thickness changes and cycle number are in linear proportion with different slopes, indicating two distinct regions of Li metal structural evolutions: Region I—fast cell swelling rate during initial 50 cycles, and Region II—relatively slow swelling rate in the subsequent long cycling. Phenomenologically, the swelling of the Li anode can be thought of as de-sintering, an opposite problem of sintering, which is the densification process of ceramic or metal particles. The dimensional change in sintering can be related to the sintering time by a power law, and power is determined by the detailed materials transport mechanism, surface diffusion, bulk diffusion, or liquid phase transport (Kingery et al., *Introduction of Ceramics*, 2nd Ed, Wiley 1976). Although the electrochemical processes involved in Li anode swelling are much more complex, the different power law behavior suggests a two-stage process for Li anodes during long cycling, which is consistent with different morphological evolution processes. In Region I, the initial 50 cycles, the flat Li foil converts to solid large Li particles covered by SEI constituents, which leads to a fast volume expansion of anode and thus a rapid cell thickening; in Region II, the external pressure helps the Li metal anode maintain good contact between individual Li particles to ensure a percolation pathway for both ions and electrons and drives the lean electrolyte to wet the newly formed Li surfaces (FIG. 45). The compatible electrolyte and uniform pressure help to slow down the cell swelling and extend the cycling, but the formation of Li particles are still present in practical cells at current stage (FIG. 46). In Region II, during subsequent long-term cycling, the external pressure helps the Li anode to maintain good contact between the individual Li particles to ensure a percolation pathway for both ions and electrons, and drive the lean electrolyte to wet the newly formed Li surfaces. Therefore, the electrochemical reactions continue to occur inside the Li particles (FIG. 47), resulting in evolution of solid Li particles to a highly porous structure. In other words, the utilization rate of individual Li particles is greatly improved in the presence of external pressure. Thus the already formed solid Li particles evolve into a highly porous sponge like structure. The volumetric expansion is effectively reduced during this stage because the external shapes and overall morphologies of the Li particles are maintained.

After extensive cycling of 200 cycles, however, the amount of "dead" Li and SEI are still being sufficiently accumulated to shut off the pouch cell operation. It is meaningful to have an additional parameter in LMB research to quantify the amount of "dead" Li generated during each cycle which will be more indicative to predict the Li metal cell life rather than using Coulombic Efficiency alone.

tabs were used for electrical connections to the anodes and cathodes. The cathode was composed of 96 wt % NMC622, 2 wt % carbon, and 2 wt % binder. The electrolyte was 1.2 M LiFSI-TEP/BTFE, and the cell had an E/C ratio of 3 g/Ah.

The protruding tab has a resistance $R=\rho L/A$ where $\rho$ is resistivity, L is length, and A is cross-sectional area. Heat Q generated in the tab is calculated as $Q=I^2Rt=mc\Delta T$, where I is current (ampere), R is resistance (ohm), t is time (s), m is mass (g), c is specific heat (J/g×° C.), and T is temperature (° C.).

FIG. 6 is a schematic diagram of a typical anode 110 with a copper current collector 130 including a protruding tab 131, and an anode 110A with a copper current collector 13 having a protruding tab 131 and a support tab 135. Circuit diagrams for the two anodes are also shown. As shown in Table 6, evaluation of the cells demonstrated that including the support tab dramatically reduced the temperature change on the protruding tabs 131.

TABLE 6

|  | 2 μm Cu foil in 350 Wh/kg Li—S cell (2.3 Ah) | 9 μm Cu mesh in 372 Wh/kg Li—S cell (2.5 Ah) | Anode 110A with 2 μm Cu foil + tab |
| --- | --- | --- | --- |
| Resistivity ρ [Ω*mm] | 1.75E−05 | | |
| Resistance R of each tab [Ω] | 2.5E−03 | 5.56E−04 | |
| Current flown on each tab (C/10) [A] | 0.0177 | 0.028 | |
| Discharge time [s] | 36000 | 36000 | |
| Total heat generated on each tab layer (without considering heat dissipation) Q at C/10 [J] | 0.02817 | 0.01583 | |
| Density [g/cm³] | 8.9 | | |
| Weight [g]* | 0.000249 | 0.0011 | |
| Heat capacity C [J/(kg*° C.] | 390 | | |
| ΔT on each tab at C/10 [° C.]† | 289.9 | 36.2 | 8.3 |

*Weight of the tab only
†if C/3, ΔT = 968° C. for 2 μm Cu foil

Example 5

350 Wh/kg Li Metal Pouch Cell

Figure 48:
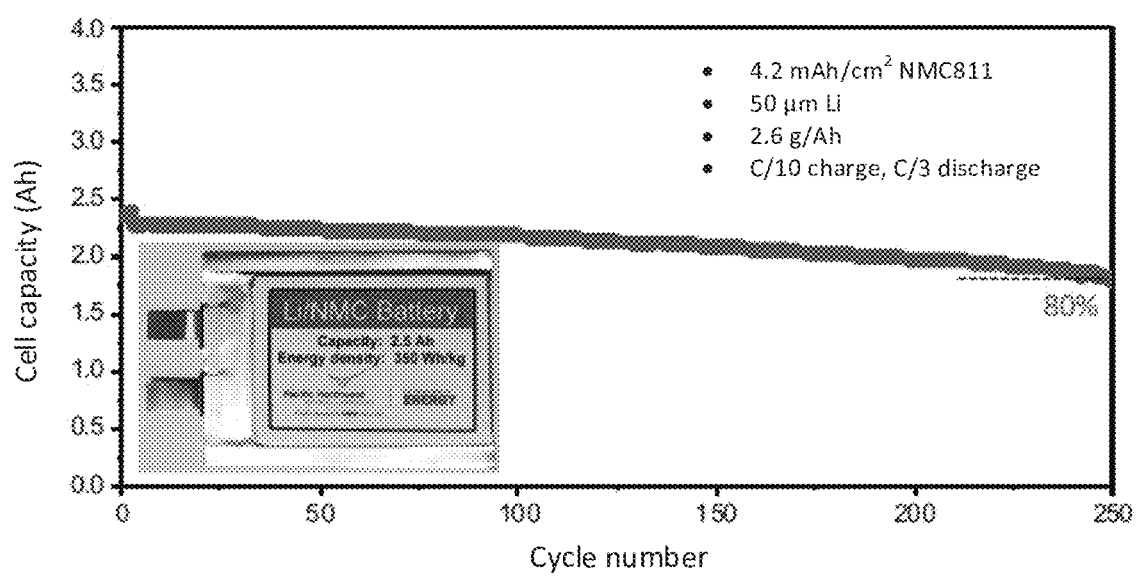
FIG. 48 is a graph showing capacity retention of a 350 Wh/kg Li∥NMC811 pouch cell over 250 cycles with charging at C/10 and discharging at C/3.

A 350 Wh/kg Li metal pouch cell was prepared. The cathode was NMC811 and had an areal capacity of 4.2 mAh/cm². The anode was prepared with 50 μm Li foil. The electrolyte was 1.2 M LiFSI-TEP/BTFE, and the cell had an E/C ratio of 2.6 g/Ah. The cell was charged at C/10 rate and discharged at C/3 with an applied external compression force of 70 kPa (10 psi). As shown in FIG. 48, the cell maintained 80% capacity retention after 250 cycles.

Example 6

300 Wh/kg Li||NMC622 Pouch Cell with a Support Tab

Two Li||NMC622 pouch cells were prepared. Each cell included an anode comprising a 2-μm thick copper foil current collector having a length of 55.5 mm and a width of 36.5 mm with a protruding tab having a length of 2 mm, a width of 7 mm, and a thickness of 2 μm. One pouch cell further included a copper mesh support tab having a length of 2 mm, a width of 7 mm, and a thickness of 9 μm. Nickel In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A lithium metal pouch cell, comprising:
an anode comprising lithium metal and an anode current collector, the anode having an anode areal capacity from 0.2 to 10 mAh·cm⁻², wherein
the anode comprises a first layer of lithium metal and a second layer of lithium affixed to opposing sides of the anode current collector,
the first layer of lithium metal has a first surface in contact with the anode current collector and the anode current collector having a protruding tab extending past a terminal end of the first layer of lithium metal, and
the second layer of lithium metal has a first surface in contact with the anode current collector and an opposing surface, and the protruding tab of the anode current collector extending past a terminal end of the second layer of lithium metal;

a cathode comprising a cathode material and a cathode current collector, the cathode having a cathode areal capacity from 2 to 10 mAh·cm$^{-2}$, wherein a ratio of N/P is within a range of 0.02 to 5;

an electrolyte comprising a lithium active salt and a solvent, the electrolyte having an electrolyte mass E and the lithium metal pouch cell having an electrolyte mass to cell capacity (E/C) ratio within a range of 1 to 6 g·Ah$^{-1}$;

a separator positioned between the anode and the cathode;

a packaging material defining a pouch enclosing the anode, cathode, electrolyte, and separator; wherein the protruding tab of the anode current collector and a protruding tab of the cathode current collector extend external to the pouch; and a support tab affixed to the opposing surface of the second layer of lithium metal adjacent the terminal end of the second layer and aligned with the protruding tab of the anode current collector, the support tab extending past the terminal end of the second layer of lithium, having a terminal end external to the pouch, having a thickness greater than a thickness of the protruding tab of the anode current collector, and made of the same material as the anode current collector;

the lithium metal pouch cell having a specific energy ≥300 Wh·kg$^{-1}$.

2. The lithium metal pouch cell of claim 1, wherein the cathode areal capacity is within a range of from 3 to 5 mAh·cm$^{-2}$.

3. The lithium metal pouch cell of claim 1, wherein:
(i) each layer of lithium metal has a thickness within a range of 1 to 60 µm prior to cycling the lithium metal pouch cell; or
(ii) the anode current collector has a thickness within a range of 50 nm to 5 µm; or
(iii) both (i) and (ii).

4. The lithium metal pouch cell of claim 3, wherein:
the anode current collector has a thickness within a range of 50 nm to 3 µm.

5. The lithium metal pouch cell of claim 1, wherein:
(i) the terminal end of the support tab is aligned with a terminal end of the protruding tab of the anode current collector; or
(ii) a proximal end of the support tab is aligned with the terminal end of the first layer of lithium metal; or
(iii) both (i) and (ii).

6. The lithium metal pouch cell of claim 1, wherein:
the support tab is a perforated metal tab.

7. The lithium metal pouch cell of claim 1, wherein:
(i) the support tab has a thickness within a range of 3 to 18 µm; or
(ii) the support tab has a length within a range of 2 to 10 mm; or
(iii) both (i) and (ii).

8. The lithium metal pouch cell of claim 1, further comprising:
a plurality of cathodes;
a plurality of anodes, each anode comprising
a first layer of lithium metal and a second layer of lithium metal affixed to opposing sides of an anode current collector, the second layer having a first surface in contact with the anode current collector and an opposing surface, and
a support tab affixed to the opposing surface of the second layer of lithium metal; and
a plurality of separators, wherein a separator is positioned between each anode and an adjacent cathode,
wherein the protruding tabs of the anode current collectors and the support tabs are adhered together.

9. The lithium metal pouch cell of claim 1, wherein:
(i) the lithium metal comprises from 1 wt % to 10 wt % of the pouch cell; or
(ii) the anode current collector and support tab together comprise from 5 wt % to 10 wt % of the pouch cell; or
(iii) the cathode material comprises from 40 wt % to 60 wt % of the pouch cell; or
(iv) the cathode current collector comprises from 2 wt % to 6 wt % of the pouch cell; or
(v) the electrolyte comprises from 20 wt % to 30 wt % of the pouch cell; or
(vi) the separator comprises from 2 wt % to 5 wt % of the pouch cell; or
(vii) the packaging material comprises from 5 wt % to 10 wt % of the pouch cell; or
(viii) any combination of (i), (ii), (iii), (iv), (v), (vi), and (vii).

10. The lithium metal pouch cell of claim 1, wherein the cathode comprises a first layer of cathode material and a second layer of cathode material affixed to opposing sides of the cathode current collector, and wherein:
(i) each layer of cathode material has a thickness within a range of 50 to 200 µm; or
(ii) the cathode current collector has a thickness within a range of 8 to 20 µm; or
(iii) both (i) and (ii).

11. The lithium metal pouch cell of claim 1, wherein the cathode material comprises a cathode active material comprising LiNi$_x$Mn$_y$Co$_z$O$_2$ (NMC, x+y+z=1), Li$_{1+w}$Ni$_x$Mn$_y$Co$_z$O$_2$ (x+y+z+w=1, 0≤w≤0.25), LiCoO$_2$ (LCO), LiNi$_{0.8}$Co$_{0.15}$Al$_{0.05}$O$_2$ (NCA), LiNi$_{0.5}$Mn$_{1.5}$O$_4$ spinel, LiMn$_2$O$_4$ (LMO), LiFePO$_4$ (LFP), Li$_{4-x}$M$_x$Ti$_5$O$_{12}$ (M=Mg, Al, Ba, Sr, or Ta; 0≤x≤1), MnO$_2$, V$_2$O$_5$, V$_6$O$_{13}$, LiV$_3$O$_8$, LiM$^{C1}_x$M$^{C2}_{1-x}$PO$_4$ (M$^{C1}$ or M$^{C2}$=Fe, Mn, Ni, Co, Cr, or Ti; 0≤x≤1), Li$_3$V$_{2-x}$M$^1_x$(PO$_4$)$_3$ (M$^1$=Cr, Co, Fe, Mg, Y, Ti, Nb, or Ce; 0≤x≤1), LiVPO$_4$F, LiM$^{C1}_x$M$^{C2}_{1-x}$O$_2$ (M$^{C1}$ and M$^{C2}$ independently are Fe, Mn, Ni, Co, Cr, Ti, Mg, or Al; 0≤x≤1), LiM$^{C1}_x$M$^{C2}_y$M$^{C3}_{1-x-y}$O$_2$ ((M$^{C1}$, M$^{C2}$, and M$^{C3}$ independently are Fe, Mn, Ni, Co, Cr, Ti, Mg, or Al; 0≤x ≤1; 0≤y≤1), LiMn$_{2-y}$X$_y$O$_4$ (X=Cr, Al, or Fe, 0≤y≤1), LiNi$_{0.5-y}$X$_y$Mn$_{1.5}$O$_4$ (X=Fe, Cr, Zn, Al, Mg, Ga, V, or Cu; 0≤y<0.5), xLi$_2$MnO$_3$·(1-x)LiM$^{C1}_y$M$^{C2}_z$M$^{C3}_{1-y-z}$O$_2$ (M$^{C1}$, M$^{C2}$, and M$^{C3}$ independently are Mn, Ni, Co, Cr, Fe, or mixture thereof; x=0.3-0.5; y≤0.5; z≤0.5), Li$_2$M$^2$SiO$_4$ (M$^2$=Mn, Fe, or Co), Li$_2$M$^2$SO$_4$ (M$^2$=Mn, Fe, or Co), LiM$^2$SO$_4$F (M$^2$=Fe, Mn, or Co), Li(Fe$_{1-y}$Mn$_y$)P$_2$O$_7$ (0≤y≤1), Cr$_3$O$_8$, Cr$_2$O$_5$, a carbon/sulfur composite, Li$_2$O$_2$, Li$_2$S, LiF, or any combination thereof.

12. The lithium metal pouch cell of claim 1, wherein:
the lithium active salt comprises LiPF$_6$, LiAsF$_6$, LiBF$_4$, lithium bis(fluorosulfonyl)imide (LiFSI), lithium bis(trifluoromethanesulfonyl)imide (LiTFSI), lithium bis(oxalato)borate (LiB(C$_2$O$_4$)$_2$, LiBOB), lithium difluoro (oxalato)borate (LiBF$_2$(C$_2$O$_4$), LiDFOB), lithium bis(pentafluoroethanesulfonyl)imide (LiN(SO$_2$CF$_2$CF$_3$)$_2$, LiBETI), lithium (fluorosulfonyl trifluoromethanesulfonyl)imide (LiN(SO$_2$F)(SO$_2$CF$_3$), LiFTFSI), lithium (fluorosulfonyl pentafluoroethanesulfonyl)imide (LiN(SO$_2$F)N(SO$_2$CF$_2$CF$_3$), LiFBETI), lithium cyclo(tetrafluoroethylenedisulfonly)imide (LiN(SO$_2$CF$_2$CF$_2$SO$_2$), LiCTFSI), lithium (trifluoromethanesulfonyl)(n-nonafluorobutanesulfonyl)imide (LiN ($SO_2CF_3$)($SO_2$-n-$C_4F_9$), LiTNFSI), lithium cyclohexafluoropropane-1,3-bis(sulfonyl)imide, or any combination thereof; and the solvent comprises triethyl phosphate, trimethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, 1,2-dimethoxyethane (DME), 1,3-dioxolane (DOL), tetrahydrofuran (THF), allyl ether, dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (vinyl ethylene carbonate, VEC), 4-methylene-1,3-dioxolan-2-one (methylene ethylene carbonate, MEC), 4,5-dimethylene-1,3-dioxolan-2-one, dimethyl sulfoxide (DMSO), dimethyl sulfone (DMS), ethyl methyl sulfone (EMS), ethyl vinyl sulfone (EVS), tetramethylene sulfone (i.e. sulfolane, TMS), trifluoromethyl ethyl sulfone (FMES), trifluoromethyl isopropyl sulfone (FMIS), trifluoropropyl methyl sulfone (FPMS), diethylene glycol dimethyl ether (diglyme), triethylene glycol dimethyl ether (triglyme), tetraethylene glycol dimethyl ether (tetraglyme), methyl butyrate, ethyl propionate, gamma-butyrolactone, acetonitrile (AN), succinonitrile (SN), adiponitrile, triallyl amine, triallyl cyanurate, triallyl isocyanurate, or any combination thereof.

13. The lithium metal pouch cell of claim 12, wherein the electrolyte further comprises a diluent, the diluent comprising 1,1,2,2-tetrafluoroethyl-2,2,3,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), tris(2,2,2-trifluoroethyl)orthoformate (TFEO), tris(hexafluoroisopropyl)orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof.

14. The lithium metal pouch cell of claim 1, wherein a width of the protruding tab is equal to a width of the supporting tab.

15. A lithium metal pouch cell system, comprising:
a lithium metal pouch cell according to claim 1; and
an external pressure-applying device configured to apply a compression force to the lithium metal pouch cell.

16. The lithium metal pouch cell system of claim 15, wherein the compression force is within a range of 35 to 105 kPa.

17. The lithium metal pouch cell system of claim 15, wherein the lithium metal pouch cell exhibits ≥70% capacity retention after 50 cycles when operated under a compression force of 60-80 kPa.

18. The lithium metal pouch cell system of claim 15, wherein:
the anode current collector has a thickness within a range of 1 to 3 μm.

19. The lithium metal pouch cell system of claim 15, wherein:
the lithium active salt comprises $LiPF_6$, $LiAsF_6$, $LiBF_4$, lithium bis(fluorosulfonyl)imide (LiFSI), lithium bis(trifluoromethanesulfonyl)imide (LiTFSI), lithium bis(oxalato)borate ($LiB(C_2O_4)_2$, LiBOB), lithium difluoro(oxalato)borate ($LiBF_2$ ($C_2O_4$), LiDFOB), lithium bis(pentafluoroethanesulfonyl)imide ($LiN(SO_2CF_2CF_3)_2$, LiBETI), lithium (fluorosulfonyl trifluoromethanesulfonyl)imide ($LiN(SO_2F)(SO_2CF_3)$, LiFTFSI), lithium (fluorosulfonyl pentafluoroethanesulfonyl)imide ($LiN(SO_2F)N(SO_2CF_2CF_3)$, LiFBETI), lithium cyclo(tetrafluoroethylenedisulfonly)imide ($LiN(SO_2CF_2CF_2SO_2)$, LiCTFSI), lithium (trifluoromethanesulfonyl)(n-nonafluorobutanesulfonyl)imide ($LiN(SO_2CF_3)(SO_2$-n-$C_4F_9)$, LiTNFSI), lithium cyclohexafluoropropane-1,3-bis(sulfonyl)imide, or any combination thereof; and the solvent comprises triethyl phosphate, trimethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, 1,2-dimethoxyethane (DME), 1,3-dioxolane (DOL), tetrahydrofuran (THF), allyl ether, dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (vinyl ethylene carbonate, VEC), 4-methylene-1,3-dioxolan-2-one (methylene ethylene carbonate, MEC), 4,5-dimethylene-1,3-dioxolan-2-one, dimethyl sulfoxide (DMSO), dimethyl sulfone (DMS), ethyl methyl sulfone (EMS), ethyl vinyl sulfone (EVS), tetramethylene sulfone (i.e. sulfolane, TMS), trifluoromethyl ethyl sulfone (FMES), trifluoromethyl isopropyl sulfone (FMIS), trifluoropropyl methyl sulfone (FPMS), diethylene glycol dimethyl ether (diglyme), triethylene glycol dimethyl ether (triglyme), tetraethylene glycol dimethyl ether (tetraglyme), methyl butyrate, ethyl propionate, gamma-butyrolactone, acetonitrile (AN), succinonitrile (SN), adiponitrile, triallyl amine, triallyl cyanurate, triallyl isocyanurate, or any combination thereof.

20. The lithium metal pouch cell system of claim 19, wherein the electrolyte further comprises a diluent, the diluent comprising 1,1,2,2-tetrafluoroethyl-2,2,3,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), tris(2,2,2-trifluoroethyl)orthoformate (TFEO), tris(hexafluoroisopropyl)orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof.

* * * * *